(12) United States Patent
Kim et al.

(10) Patent No.: US 11,037,095 B2
(45) Date of Patent: Jun. 15, 2021

(54) DISTRIBUTED LEDGER TECHNOLOGY FOR FREIGHT SYSTEM

(71) Applicant: Accenture Global Solutions Limited, Dublin (IE)

(72) Inventors: Yei Sung Kim, Princeton Junction, NJ (US); Tricia Assar Agrawal, Houston, TX (US); Ahson Syed Hasnain, Allen, TX (US); Matthew Joseph Widdowson, Houston, TX (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 793 days.

(21) Appl. No.: 15/813,969

(22) Filed: Nov. 15, 2017

(65) Prior Publication Data

US 2019/0080284 A1    Mar. 14, 2019

Related U.S. Application Data

(60) Provisional application No. 62/556,994, filed on Sep. 11, 2017.

(51) Int. Cl.
*G06Q 10/08* (2012.01)
*H04L 29/06* (2006.01)
(Continued)

(52) U.S. Cl.
CPC ......... *G06Q 10/0833* (2013.01); *G06Q 50/28* (2013.01); *H04L 63/0428* (2013.01); *H04W 4/021* (2013.01)

(58) Field of Classification Search
CPC ............. G06Q 10/083; G06Q 10/0833; G06Q 10/0835; G06Q 10/0837; H04L 63/0428; H04W 4/021
(Continued)

(56) References Cited

U.S. PATENT DOCUMENTS 8,392,339 B2    3/2013  Kraft
2003/0163378 A1*  8/2003  Podgurny ........... G06F 3/04847
                                                    705/26.1
(Continued)

FOREIGN PATENT DOCUMENTS

JP      2002-308439 A    10/2002
JP      2002-309439 A    10/2002
(Continued)

OTHER PUBLICATIONS

Bocek et. al., "Blockchains Everywhere—A Use-case of Blockchains in the Pharma Supply-Chain", Jul. 2017 IFIP/IEEE International Symposium on Integrated Network Management (IM2017): Experience Session—Full Paper (Year: 2017).*
(Continued)

*Primary Examiner* — Emmett K. Walsh
(74) *Attorney, Agent, or Firm* — Brinks Gilson & Lione

(57) ABSTRACT

A system may receive a tracking update created by a tracking device. The tracking update comprising geographic location information indicative of a current geographic location of the tracking device. The system may identify, in a blockchain, a smart contract including executable logic configured to calculate a tracking metric. The system may determine, using the executable logic, the tracking metric in response to receipt of the tracking update. The system may append a datablock to the blockchain. The datablock may include the tracking metric and the geographic location information. The system may synchronize the blockchain with a plurality of blockchains stored in blockchain databases.

20 Claims, 17 Drawing Sheets

(51) Int. Cl.
  *H04W 4/021*  (2018.01)
  *G06Q 50/28*  (2012.01)
(58) Field of Classification Search
  USPC ........................................................ 705/333
  See application file for complete search history.

(56) References Cited

U.S. PATENT DOCUMENTS

| | | | | |
|---|---|---|---|---|
| 2010/0088199 | A1* | 4/2010 | McKethan | G06Q 10/087 |
| | | | | 705/28 |
| 2010/0262555 | A1* | 10/2010 | Dickman | G06Q 10/0834 |
| | | | | 705/335 |
| 2015/0278759 | A1* | 10/2015 | Harris | H04W 4/024 |
| | | | | 705/338 |
| 2016/0110807 | A1* | 4/2016 | Downes | G06Q 40/04 |
| | | | | 705/37 |
| 2016/0217399 | A1 | 7/2016 | Roelofs et al. | |
| 2017/0061561 | A1* | 3/2017 | Cha | H04W 4/023 |
| 2018/0096360 | A1* | 4/2018 | Christidis | G06Q 20/02 |
| 2018/0205555 | A1 | 7/2018 | Watanabe et al. | |
| 2018/0220278 | A1 | 8/2018 | Tal et al. | |
| 2018/0341910 | A1* | 11/2018 | Broveleit | G06Q 50/28 |
| 2020/0151715 | A1* | 5/2020 | Sato | G06Q 20/389 |

FOREIGN PATENT DOCUMENTS

| | | |
|---|---|---|
| WO | WO 2017/010455 A1 | 1/2017 |
| WO | WO 2017/027648 A1 | 2/2017 |
| WO | WO 2017/143435 A1 | 8/2017 |

OTHER PUBLICATIONS

SAP Transportation Management, Jun. 2015, pp. 1-52, SAP Americas, SAP SE.

SAP Transportation Management 9.3, Using SAP NetWeaver 7.4, Jan. 21, 2016, pp. 1-38, Master Guide, Document version: 1.2—Jan. 21, 2016; SAP SE.

Extended European Search Report from European Application No. 18189040.1, dated Oct. 9, 2018, pp. 1-9, European Patent Office, Munich, Germany.

Frederic Vedrunes, "A Peer-to-Peer Transportation System of Objects of Objects", dated Mar. 31, 2017, pp. 1-5, Revision 2.1, retrieved from the Internet at URL: https://pacifics.org/whitepaper.

Anonymous, "Case Study 3: Chain of Shipping," Chain of Things, dated Jan. 1, 2016, pp. 1-12, published by Chain of Things Limited, Hong Kong, China.

Nicola Nel, "Rise of the Smart Port: A Case for Blockchain Technology?" dated Jul. 30, 2017, pp. 1-2, published online by Bowmans at URL: https://www.bowmanslaw.com/insights/fintech/rise-smart-port-case-blockchain-technology/.

Office Action for corresponding Japanese Application No. 2018-167560 dated Nov. 29, 2019, with English summary 5p.

European Office Action, dated May 27, 2020, pp. 1-4, issued in European Patent Application No. 18189040.1, European Patent Office, Munich, Germany.

Singapore Office Action, issued in SG Patent Application No. 10201807345P, dated Sep. 11, 2019, pp. 1-10, Paya Lebar Quarter, Singapore.

K. Christidis et al., "Blockchains and Smart Contracts for the Internet of Things," Special Section on the Plethora of Research in Internet of Things, IEEE Access, vol. 4, Electronic ISSN 2169-3536, dated May 10, 2016, pp. 2292-2303, published online by IEEE at URL https://doi.org/10.1109/ACCESS.2016.2566339.

Riham AlTawy et al., "Lelantos: A Blockchain-based Anonymous Physical Delivery System," 2017 15th Annual Conference on Privacy, Security, and Trust (PST), ISBN 978-1-5386-2487-6, dated Aug. 28, 2017, pp. 1-12, published online by IEEE at URL https://doi.org/10.1109/PST.2017.00013, Calgary, Canada.

Philip Boucher et al., "How blockchain technology could change our lives," European Parliamentary Research Service, ISBN 978-92-846-0549-1, dated Feb. 28, 2017, pp. 1-28, published online by Scientific Foresight Unit (STOA) at URL https://www.europarl.europa.eu/RegData/etudes/IDAN/2017/581948/EPRS_IDA(2017)581948_EN.pdf.

Prasad Satyavolu et al., "Blockchain's Smart Contracts: Driving the Next Wave of Innovation Across Manufacturing Value Chains," Cognizant 20-20 Insights, dated Jun. 8, 2016, pp. 1-10, published online by Cognizant at URL https://www.cognizant.com/whitepages/blockchains-smart-contracts-driving-the-next-wave-of-innovation-across-manufacturing-value-chains-codex2113.pdf.

Chain of Things, "Case Study 3: Chain of Shipping," dated Sep. 20, 2016, pp. 1-10, Retrieved from the Internet on Dec. 12, 2019, published online by Chain of Things at URL https://www.chainofthings.com/cs3chainofshipping.

Arshdeep Bahga et al., "Blockchain Platform for Industrial Internet of Things," Journal of Software Engineering and Applications, vol. 9, No. 10, ISSN 1945-3124, dated Oct. 28, 2016, pp. 533-546, published online by Scientific Research Publishing at URL http://dx.doi.org/10.4236/isea.2016.910036.

Wang, Chuanlei et al., "A Model of Logistics Information Ecosphere of Supply Chain Based on Block Chain"; with English abstract, dated Feb. 6, 2017, pp. 115-121.Anhui University Business School, City University of Hong Kong.

Singapore Office Action, dated Aug. 5, 2020, pp. 1-6, issued in Singapore Patent Application No. 10201807345P, Intellectual Property Office of Singapore, Singapore.

* cited by examiner

Rate Contracts

| ID | Carrier | Origin | Destination | Mode | Price/Mile | Minimum Price | Surcharge | Detention Time | Detention Rate |
|---|---|---|---|---|---|---|---|---|---|
| 100 | Kim Company | Shreveport, LA | Minot, ND | TL | $1.85 | $2,000.00 | $0.50 | 120 | $1.10 |
| 110 | Kim Company | Seattle, WA | Eugene, OR | TL | $2.90 | $999.99 | $0.55 | 125 | $1.10 |
| 120 | Kim Company | Cotulla, TX | Goliad, TX | TL | $2.10 | $1,800.00 | $0.60 | 130 | $1.15 |

Freight Orders

| Id | Shipper | Origin | Destination | Status | Order Start | Order End | Assign |
|----|---------|--------|-------------|--------|-------------|-----------|--------|
| 162 | Oil Field Supplier | Big Spring, TX | Lamesa, TX | Paid | 2017-08-25T15:58:4... | | Assign |
| 331 | Oil Field Supplier | Seattle, WA | Eugene, OR | Paid | 2017-08-24T16:19:3... | | Assign |
| 371 | Oil Field Supplier | Shreveport, LA | Mitch, MD | Pending | 2017-08-31T21:49:2... | | Assign |
| 46 | Oil Field Supplier | Seattle, WA | Eugene, OR | Approved | 2017-08-25T19:04:2... | | Assign |

DISTRIBUTED LEDGER TECHNOLOGY FOR FREIGHT SYSTEM

CROSS REFERENCE TO RELATED APPLICATIONS

This application claims the benefit of U.S. Provisional Application No. 62/556,994 filed Sep. 11, 2017, the entirety of which is hereby incorporated by reference.

TECHNICAL FIELD

This disclosure relates to distributed information management and, in particular, to managing transportation and logistical information with distributed ledger technology.

BACKGROUND

Transportation services rendered by truck, train, plane, ship, or other methods of transportation may involve agreements between parties for transporting freight. Traditional approaches to tracking the transportation of freight may involve inefficient processes, inaccurate data collection, and/or encumbered systems. In some Freight Bill Audit and Pay (FBAP) systems, transportation service providers may submit shipping information to satisfy the terms and conditions of a shipping agreement. Due to the deficiencies in current market solutions, the shipping information may be unverified and cumulative. Moreover, traditional approaches to FBAP processes may be prone to frequent errors, manually cumbersome, and/or unable to efficiently collect and process information in a timely manner.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 11 illustrate a second example of a display interface for a system.
FIG. 12 illustrates a third example of a display interface for a system.
FIG. 13 illustrates a fourth example of a display interface for a system.

DETAILED DESCRIPTION

Figure 1:
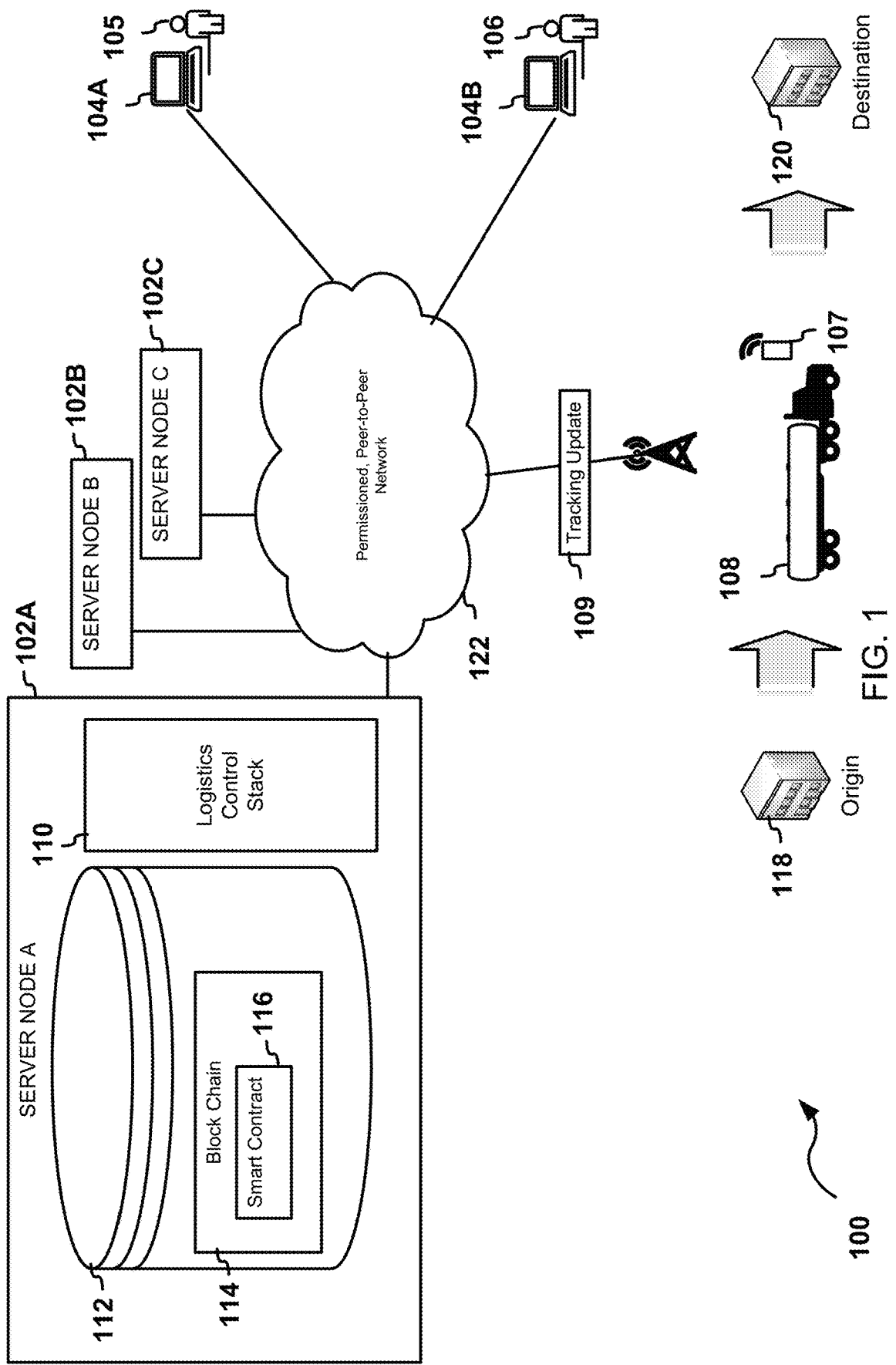
FIG. 1 illustrates an example of a system.

The commercialized management, tracking, and transportation of goods may generate large quantities of information that are recorded in ledgers at distributed locations. For example, companies with significant transportation transactions, may generate transactions and other information related to the shipment or transportation of goods, or other cargo, including bulk, by truck, rail, plane, ship, and other transportation methods. For transport services, in one example, transportation providers may submit freight invoices. Each freight invoice may include multiple line items related to events that arise before, during, and/or after the shipment of freight across multiple locations. The distributed nature of transportation management, the complexities of maintaining integrity of transactions—including freight order, contracts, rate, and invoicing—and the vast number of people involved in transportation management result in discrepancies, delays, and other inefficiencies. In many circumstances, a shipper, or the customer requesting the transportation service, or other authority, may manually audit the invoices for accuracy and reconcile data stored in many locations. In some examples, an audit may include matching pickups, deliveries, goods issued, goods received, accessorial charges, fuel surcharges, fines/fees, and/or other information. Because, FBAP is not perceived as a core competency for many companies, outside service providers often match invoices to contracts and rate cards, provide auditing services, and fund payments. Alternatively or in addition, other disputes are often reconciled by the shipper's, or transportation customer's, freight bill department, thereby requiring additional time and resources.

In some circumstances, supply chain partners may interact with their lateral, upstream and downstream partners. Many of these interactions involve systems that are stored and utilized solely on the company platforms. Information is stored independently on each system which causes significant inefficiencies. A system and methods for managing distributed ledgers is included herein. The primary example for this document covers freight or transportation management, however, the solution may be applicable to other supply chain system and functions. The included method and system improves, among other technical advancements, digital data flow, decentralizing control and creating a single source of truth for transaction information. The systems, methods, and examples provided below may provide may extend to supply chain functions including but not limited to supply & demand management, sourcing, procurement, inventory & warehouse management, order fulfillment, transportation, logistics, and manufacturing.

A system and methods for managing a distributed ledger are provided. The systems and methods described herein may be applicable to freight management, or more generally, to any system where information is managed on a ledger. The systems and methods described below should not be seen as a closed platform limited to the primary example in freight management, but rather a system of approach for blockchains within supply chain functions. By way of an introductory example, the system may receive a tracking update created by a tracking device. The tracking update is comprised of geographic location information, indicative of a current geographic location of the tracking device. The system may identify, in a blockchain, a smart contract including executable logic configured to calculate a tracking metric. The system may determine, using the executable logic, the tracking metric in response to receipt of the tracking update. The system may append a datablock to the blockchain. The datablock may include the tracking metric and the geographic location information. The system may synchronize the blockchain with a plurality of blockchains stored in blockchain databases.

One interesting feature of the system and methods described below may be that a blockchain platform may provide provenance of ledger data and history. Leveraging the blockchain in a distributed ledger may result in a growing, shared digital data flow, which serves as the single source of truth for transaction information. For example, ledger data may be stored across replicated, distributed nodes in real-time. Utilizing the blockchain by, for example, a freight bill audit and pay (FBAP) process may secure transmission of information, decentralize the distributed ledger, and/or automate reconciliation of information. For example, shippers, carriers, and other authorities may rely on the distributed ledger without having to manually reconcile invoices. In some examples, sharing access to a growing chain of appended transactions may eliminate costly reconciliations from sourcing, procurement, integrated planning, fulfillment and/or other stages of transportation. The blockchain may prevent collusion of rates, and other information by carriers. In addition, the blockchain may prevent duplication of information and provide a single source of truth for FBAP and/or regulatory processes.

Alternatively or in addition, smart contracts, freight rates, realtime-geolocation, and/or other information related to shipments may be stored in the distributed ledger. The smart contract or blockchain may include self-executing logic that implements transportation management activities. The self-executing logic may increase cohesion between computing systems and reduce errors from manual interventions or inconsistent data. In some examples, companies may reduce external freight bill processing by storing self-executing logic in the distributed ledger. For example, the smart contract may include logic to calculate invoice line items and/or include other logic related to FBAP processes. Alternatively, or in addition, tracking information may be automatically evaluated by self-executing logic stored in the distributed ledger to generate and/or update invoices, send urgent notifications, and/or control the flow of shipments between origin and destination.

The system and methods described below may provide a new approach to peer to peer collaboration for multi-partner supply chains. One of the technical advances of the systems and methods described below is that inefficiencies in communication, data transaction and decision points between nodes may be dramatically improved. The new method and systems of collaboration offer significant enhancements to the current tools and techniques by virtue of bringing together the decentralized nodes, distributed ledger, and smart contracting in one platform. The systems and methods described provide a blueprint or template to create more flexible, agile and error-resistant collaborative tools for supply chains.

The systems and method may provide a modular approach to allow for scalability in other business functions and provide additional functionality to be introduced into the distributed ledger and smart contract. The systems and methods, as a whole, is a flexible platform that allows for introducing new process and incorporating improvements and modifications to current features. Additional benefits, efficiencies, and improvements are made evident in the systems and methods described below. Hence, the systems and methods described herein offer improvements over existing market solutions.

FIG. 1 illustrates an example of a system 100. The system 100 may include server nodes 102A-C, terminal devices 104A-B, and a tracking device 107. The terminal devices 104A-B may communicate with one or more of the server nodes 102A-C. The terminal devices 104A-B may include a shipper device 104A, a carrier device 104B, and/or any other electronic device in communication with one or more of the server nodes 102A-C. The shipper device 104A may be associated with a shipper 105 and the carrier device 104B may be associated with a carrier 106. The tracking device 107 may be included with, or in proximity, to a shipment 108. The tracking device 107 communicate a tracking update 109 to one or more of the server nodes 102A-C.

The server nodes 102A-C may include any node in communication with a network. The server nodes 102A-C may communicate with each other, the terminal devices 104A-B, the tracking device 107, and/or any other device via the network. One or more of the server nodes 102A-C may include a logistics control stack 110 and/or a blockchain database 112. The logistic control stack 110 may process information and/or events related to freight transportation and management. The logistics control stack 110 may interact with the blockchain database 112 to build and manage a distributed ledger for one or more shipment. Alternatively or in addition, the logistic control stack 110 may interact with the blockchain database 112 to conduct operations and/or provide user interfaces. In some examples, the logistics control stack 110 may generate one or more blockchain 114, append information to the blockchain 114, execute logic stored on the blockchain 114, communicate information stored on the blockchain 114, and/or otherwise manage the blockchain 114. Alternatively or in addition, the logistics control stack may communicate with the blockchain database 112, the tracking device 107, one or more of the terminal devices 102A-B and/or one or more of the service nodes A-C. In some examples, the logistics control stack 110 may include middleware services that implement monitoring, maintenance, and operations using the information included in the blockchain 114 and/or the tracking update 109. The middleware services may communicate with the blockchain database 112, other service nodes, and/or legacy systems where information is imported to the blockchain database 112. Alternatively or in addition, the logistics control stack 110 may bridge one or more client databases with the server nodes 102A-C. For example, the logistics control stack 110 may query the client databases and generate datablocks for the blockchain 114. For example, the logistics control stack 110 may identify existing freight orders, contracts, and other information in the client databases and include the freight orders, contracts, and other information in the blockchain 114.

The terminal devices 104A-B may include devices remote to the server nodes 102A-C. In some examples, the terminal devices 104A-B may be associated with accounts. For example, the shipper device 104A and/or the shipper 105 may be associated with a first account identifier. Alternatively or in addition, the carrier device 104B and/or the carrier 106 may be associated with a second account identifier. The account identifiers may be stored in the blockchain database, an account repository included in one or more of the server nodes 104A-C, and/or in an external system.

In some examples, the terminal devices 104A-B may be associated with accounts made available to or managed by the logistics control stack 110. The terminal devices 104A-B may include, for example, the shipper device 104A, a carrier device 104B, or any other system or device capable of communicating with one or more of the server nodes 102A-C. The shipper device 104A may include a device associated with a shipping company and/or an account identifier of the shipping company. The carrier device 104B may include a device associated with a carrier company and/or an account identifier of the carrier company. The logistics control stack 110 may manage or access accounts associated with the shipping company, the carrier company, and/or any other company that is involved in the transportation of the shipment 108. The logistics control stack 110 may restrict or limited access to the features depending the account. For example, the features made available to the shipper device 104A may differ from the features made available to the carrier device 104B.

As described herein, the shipper 105 and the carrier 106 may refer to a respective types of authorities. The shipper may be responsible for selling, manufacturing, retailing, or otherwise desiring to ship the shipment 108. The shipper 105 may include a shipping organization, a user in the shipping organization, and/or a machine associated with the shipping organization. The carrier may be responsible for providing services to transport the shipment 108. The carrier 106 may include a carrier organization, or user in the carrier organization, and/or a machine associated with the carrier organization. In some examples, one or more shippers may contract with one or more carriers to transport shipments. For example, the carrier 106 may transport the shipment 108 between geographic locations. Alternatively or in addition, the shipment 108 may be handed-off between multiple carriers contracted with the shipper 105. While FIG. 1 illustrates the shipper 105 and the carrier 106 as two types of authorities for the system 100, other type's authorities may exist as well including, for example, administrators, intermediaries, and/or infrastructure.

The tracking device 107 may include any device capable of communicating the status and/or location of one or more shipments. For example, the tracking device 107 may communicate the location of the shipment 108 or events related to the shipment 108. Alternatively or in addition, the tracking device 107 may communicate the shipment departed from a location and/or arrived at a location. In other examples, the tracking device 107 may communicate the real-time status of the shipment before, during, and/or after transit of the shipment. In some examples, the tracking device 107 may receive geographic positioning information, determine geographic positioning, and/or determine the progress of the shipment 108 along a shipping route. The tracking device 107 may include a mobile phone, a sensor, a tablet, a vehicle navigation system, or any other electronic tracking device.

In some examples, the tracking device 107 may be positioned with the shipment 108 and may travel from the origin 118 to the destination 120. For example, the tracking device 107 may be physically attached to the goods being shipped. Alternatively or in addition, the tracking device 107 may be physically attached to a vehicle transporting the goods. In other examples, the tracking device 107 may be included in the electronic systems of the transportation vehicle. For example, the tracking device 107 may be included in a vehicle navigation system. The tracking device 107 may communicate with a global positioning system (GPS), mobile service provider, or any other source of geographic positioning services to receive geographic positioning information.

Alternatively or in addition, the tracking device 107 may be included with a plurality of tracking devices configured to track shipments. The tracking device may be stationary or mobile. For example, the tracking device may scan RFID information, or other sensors, on or near the shipments. The tracking device 107 may communicate geographic positioning updates related to the shipment to one or more of the server nodes 102A-C. For example, the logistics control stack 110 may append a block to the blockchain 114 in response to the geographic position update received from the tracking device 107.

Alternatively or in addition, the locations and routing information that the tracking device 107 collects may be communicated and visually or graphically represented on a user interface. The graphical representation may depict where the shipment is at a point in time, or the geographic positions may be shown on the user interface as the information is transmitted, or the geographic positions may be formatted to illustrate the route taken by the shipment. The graphical representation may be formatted, manipulated, stored for the shipper or the carrier in the logistics stack for use for data analysis, "control tower" purposes, rerouting of the shipment, navigation correction, route optimization, invoice creation, or audit purposes, amongst other intents, usage or purposes.

The shipment 108 may include freight that is transported. The shipment 108 may include a vehicle, a container, a tangible good, and/or any object or machine. The shipment 108 may be transported from one location to another and/or transferred between parties. For example the shipment may be transfers between trucks, boats, aircraft, or any other methods of transportation. The tracking device 107 may be positioned near, on, in, or with the shipment 108. In other examples, the tracking device 107 may be located at the origin, destination, or any location along a shipping route. Moreover, the amount of shipments that the tracking device tracks may vary over time. In some examples, the tracking device may follow the shipment 108. For example, the tracking device 107 may track a single or multiple shipments. In addition, the number of tracking devices used to track the shipment 108 may vary. The shipment 108 may be transferred by and/or include an agent of the carrier 106. For example, the shipment 108 may be transferred by a truck, or some other form of vehicle, owned and/or operated by the carrier 106.

In some examples, the tracking device 107 may receive configuration information. The tracking device 107 may be configured, in real time, by the logistics control stack 110. In some examples, the tracking device 107 may be configured with a unique identifier of the shipment 108 or unique identifiers of multiple shipments. Alternatively or in addition, the tracking device 107 may be configured with a location where the tracking device is configured to track shipments. In some examples, the tracking device 107 may be configured with the route the shipment 108 should take. Alternatively or in addition, the tracking device 107 may receive updates to the route, the arrival time, the departure time for the shipment 108, or any other information related to the shipment 108. The tracking device 107 may respond to receipt to the configuration information by changing the configuration of the tracking device 107.

The tracking update 109 may include any information that identifies the location of the tracking device 107 and/or the shipment 108. Alternatively or in addition, the tracking update 108 may include the date and/or time that the tracking update was generated or events related to or giving rise to occurrence of the tracking update. In some examples, the tracking update 109 may include coordinates, or any other type of location information. Alternately or in addition, the tracking update 109 may include progress information along a travel route and/or historical geographic locations of the tracking device 107. In some examples, the tracking update 109 may include a unique identifier of the shipment. Alternatively or in addition, the tracking update 109 may include configuration information that was used to configure the tracking device 107. The blockchain database 112 may include a repository that stores and/or manages one or more blockchains. The blockchain database 112 may include data structures and procedures that store and manage the blockchain 114. In some examples, each of the server nodes 102A-C may include an instance of the blockchain database 112. The blockchain database 112 may adhere to a protocol for inserting, deleting, validating, or otherwise managing the blockchain 114. The blockchain database 112, and/or other components in communication with the blockchain database 112, may synchronize the blockchain 114 across other server nodes 102A-C. For example, the server nodes 102A-C may include a first server node 102A, a second server node 1028, and a third server node 102C. Modifications to the blockchain 114 at the first server node 102A may be synchronized to the second server node 1028 and/or the third server node 102

In some examples, the tracking device 107 may include a vehicle tracking device. The vehicle tracking device may include an example of the tracking device 107 that tracks a vehicle configured with the shipment 108. Alternatively or in addition, the shipment 108 may include the vehicle and the goods that the vehicle is hauling. The vehicle tracking device may include an example of the tracking device that is included in the vehicle or located in proximity to the vehicle. For example, the tracking device may be a navigation system for a truck, boat, train, aircraft, and/or any other type of vehicle. Alternatively or in addition, the vehicle tracking device may include a mobile device associated with one or more operations of the vehicle. For example, the vehicle tracking device may include a mobile device configured with an application that communicates with the logistics control stack 110. The vehicle tracking device may communicate vehicle tracking updates. A vehicle tracking update may be an example of the tracking update 109 that is related to a vehicle in which the vehicle tracking device is configured to track.

The blockchain 114 may include a distributed ledger that stores information across multiple distributed nodes. The blockchain 114 may include datablocks appended together to form the blockchain 114. The blockchain 114 may provide a growing, shared digital data flow, which serves as the source of truth between the carrier 106, the shipper 105, and/or any other party involved in the shipment of goods. The datablocks of the blockchain 114 may include a genesis datablock that is the initial datablock of the blockchain. For example, the genesis block may be the initial freight rate contracted between the shipper and carrier. Successive datablocks may be appended to the blockchain 114 over time. The blockchain may provide a chronological ledger of information. One or more of the successive datablocks may include a hash of a previous datablock. Modifications to one or more datablocks on the blockchain 114 may cause inconsistencies in the hashed information stored in the successive datablocks. The inconsistencies may be detected by the blockchain database 112. The blockchain database 112 may prevent modification to previously appended or existing information on the blockchain 114. Alternatively or in addition, the blockchain database 112 may validate the blockchain 114 with other server nodes. In some examples, modifications to the blockchain 114 may be prohibited unless a majority, or some other predefined number, of the server nodes 102A-C consents to the modifications.

In some examples, the blockchain 114 may include a smart contract 116. The smart contract 116 may include information organized under a protocol that facilitates, verifies, and/or enforces the negotiation or performance of a contract. The smart contract 116 may be included in the blockchain 114 to help manage and track the transportation of goods and/or execute FBAP processes. For example, the smart contract 116 may include, or be based on, a contracted freight rate between the shipper 105 and the carrier 106. The freight rate may pertain to services rendered for freight transportation. The smart contract 116 may include terms, provisions, conditions, or other obligations between the shipper 105 and the carrier 106. In some examples, the smart contract 116 may include instructions and/or logic configured to enforce the obligations, or other provisions, of the freight contract. Alternatively or in addition, the smart contract 116 may include instructions and/or logic configured to detect the fulfillment or default of the obligations under the freight contract. In other examples, the smart contract 116 may include instructions and/or logic configured to execute the provisions of the freight contract, perform a computer-implemented activity that arises under the freight contract, monitor information, and/or respond to events related to the freight contract, such as shipment disruptions, or detours and frolics.

The smart contract 116 may include terms and logic related to an agreement, or proposed agreement, between one or more shippers and one or more carriers. The smart contract 116 may define one or more origin locations, one or more destinations, one or more shipments, and/or any other parameter that may be included in a freight contract. The smart contract 116 may include self-executing logic that monitors the fulfillment of the terms of the freight contract.

The smart contract 116 and/or the blockchain 114 may include rules, instructions, and/or logic that is executable by any of the server nodes 102A-C. The smart contract 116 and/or the blockchain 114 may include self-executing logic that detects information, performs computer-implemented actions, or responds to events in any way that is proposed or agreed upon between one or more parties. The self-executing logic may be implemented on any of the server nodes 102A-C, regardless of the specific operating system, hardware, or other hardware or software constraints of each of the server nodes 102A-C. Accordingly, the self-executing logic may be agnostic to hardware, operation system, and/or platform in which the self-executing logic is evaluated or executed. Because the self-executing logic is stored in the blockchain 114, unauthorized changes to the self-executing logic are minimized and easily detected. Authorized changes to the self-executing logic are recorded on the blockchain such that the blockchain provides an auditable record of all changes to the self-executing logic and/or the parties that authorized the changes.

In some examples, the smart contract 116 may include instructions, rules, and/or logic used to calculate a tracking metric. A tracking metric may include a metric that is calculated based on the self-executing logic of the smart contract 116 and/or other logic stored in the blockchain 114. The self-executing logic of the smart contract 116 may apply predetermined logic to input values, such as distance traveled, time traveled, location, weight, or any other parameter related to the shipment 108. The self-executing logic may calculate one or more tracking metrics based on the input values. Alternatively or in addition, the self-executing logic may include or access predetermined rates that are used to calculate the tracking metric.

In some examples, the tracking metric may include a transportation cost. The transportation cost may include freight price, detection price, and/or fuel price. The freight price may include a cost attributed to transporting the freight over a time and/or distance. The detention price may include a cost of detaining freight over a time period. The fuel price may include a price of fuel over a distance traveled. Alternatively or in addition, the transportation cost may include any other cost that is calculated based on the self-executing logic of the smart contract.

The blockchain 114 may include one or more smart contract, and/or combinations of various types of smart contracts. Alternatively or in addition, the smart contract 116 may be stored in one or more datablocks of the blockchain 114. The logistics control stack 110 may evaluate information included in the smart contract 116. In some examples, the logistics control stack 110 may access the logic included in the smart contract 116 to carry out the provisions of the smart contract 116. In some examples, the smart contract 116 may be included in the genesis datablock of the blockchain 114. For example, the blockchain database 112 may include multiple blockchains corresponding to various smart contracts. In other examples, the smart contract 116 may be appended to blockchains created and organized under other schemes. For example, the blockchain database 112 may create blockchains that individually correspond to one or more respective shippers, on or more respective carriers, one or more respective shipments, one or more respective origin, and/or one or more respective destination. The smart contract 116 may be included in any of the aforementioned examples of the blockchain 114.

The origin 118 may include a site where responsibility of the shipment 108 is transferred to the carrier 106. The destination 120 may include a site where responsibility of the shipment 108 is transferred away from the carrier 106. The origin 118 and/or destination 120 may include a geographic location and/or a geographic area. For example, as the tracking device 107 moves away from or to a geographic boundary, such as the geographic area and/or the geographic location, the tracking device 107 may communicate the tracking update 109. Alternatively or in addition, the origin 118 and/or the destination 120 may include a building, dock, vehicle, container and/or any other location or boundary. The shipment 108 may be transferred from the origin 118, to one or more carrier operator, and then to the destination 120. The logic for determining the circumstances for a valid transfer between the origin 118, the one or more carrier operator, and the destination 120 may be defined in the logic of the smart contract 116.

Alternatively or in addition, the transfer the shipment 108 may be based on valid transfer of a title of goods corresponding to the shipment. The valid transfer may be defined in the contract terms or in the incoterms as determined in an agreement between the shipper 105 and the carrier 106 and/or a consignee. The tracking device 107 and/or one or more smart contracts may determine valid transfer of the title of goods.

In some examples, the smart contract 116 may define the description of the origin 118 and/or destination 120. For example, the smart contract 116 may define a geographic boundary, such as a geographic area. In some examples, the logistics control stack 110 may compare the geographic location of the tracking device 107 with the geographic boundary to determine when responsibility of the shipment 108 is transferred to or away from the carrier 106. Alternatively or in addition, the logistics control stack 110 may receive transfer information that is communicated the tracking device 107, or any other device. The transfer information may indicate that an event occurred, such as a bill of lading was transferred to the carrier 106. The smart contract 116 may include logic executed by the logistics control stack 110 that evaluates the transfer information to determine if responsibility of the shipment 108 was transferred to or away from the carrier 106.

The server nodes 102A-C, the logistics control stack 110, the client terminals 104A-B, the tracking device 107, the origin 118 and/or the destination 120 may communicate via a network 122. In some examples, the network 122 may include a permissioned network. Alternatively or in addition, the network 122 may be a permissioned peer to peer network. For example, the permissions of the shipper 105 and/or the carrier 106 may be controlled via the network 122. Access to information stored on the blockchain 114 or logic provided by the logistics control stack 110 may be controlled based on the permissions of the network 122. Accordingly, in some examples, the blockchain 114 may not be provide public access, and the ability to view and add data to the blockchain 114 may be controlled based on permissions of the network 122.

The logistics control stack 110 and/or the blockchain database 112 may create and/or manage specialized blockchains tailored for freight and logistics management. The specialized blockchains may provide for efficiently tracking of one or more shipments. Alternatively or in addition, the specialized blockchains may be tailored to the smart contracts included in the specialized blockchains. The specialized blockchains may include types of datablock tailored for the smart contract 116 and/or the purpose of the blockchain 114.

Figure 2:
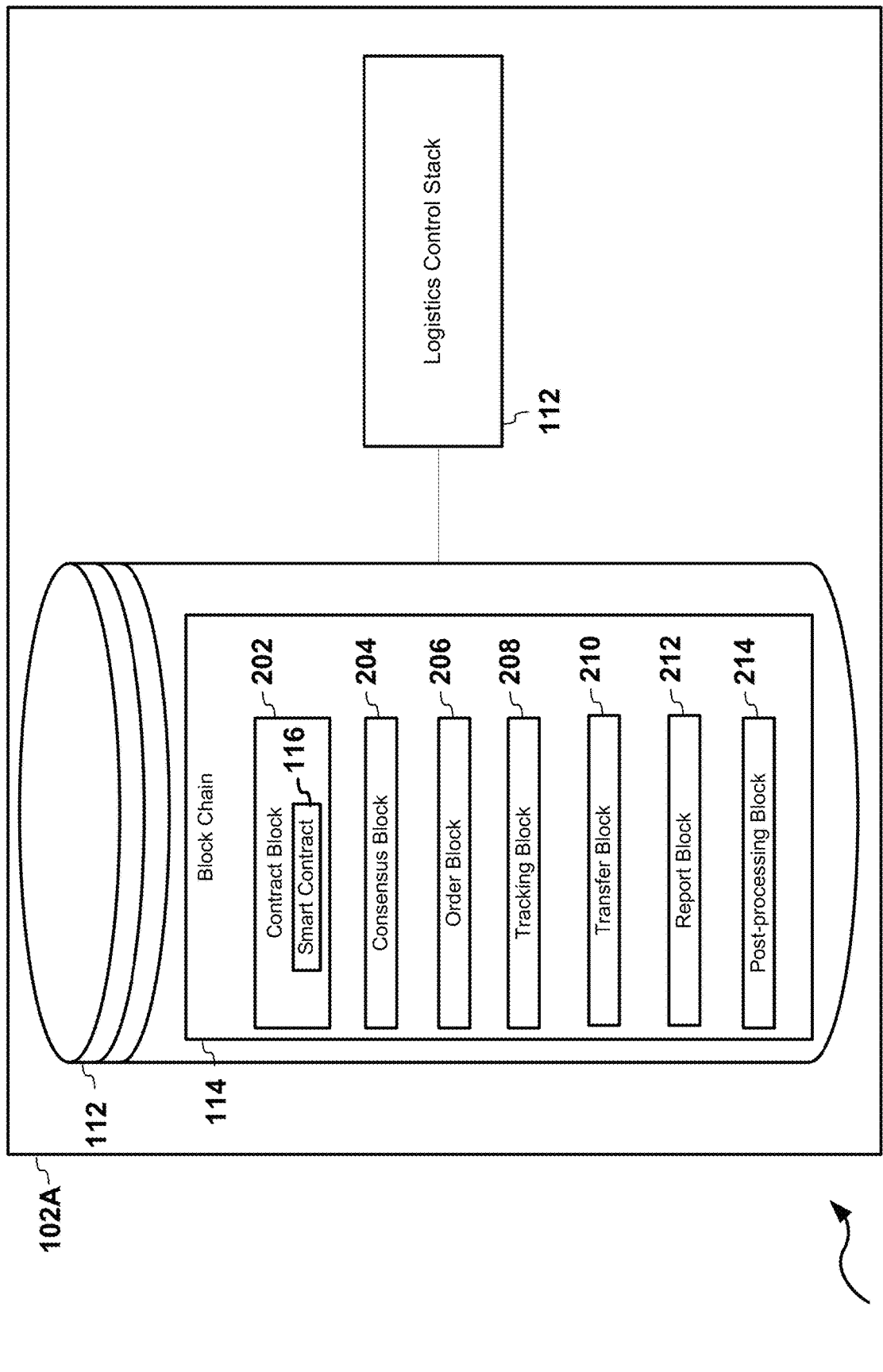
FIG. 2 illustrates an example of a server node for a system.

FIG. 2 illustrates an example of a server node for the system 100. The server node may include the blockchain database 112 and the logistics control stack 110. The blockchain 114 may include specific types of datablocks. For example, the blockchain 114 may include one or more datablock type including, for example, a contract block 202, a consensus block 204, an order block 206, a tracking block 208, a transfer block 210, a report block 212, a post-processing block 214, and/or any other type of block tailored for the blockchain 114.

The contract block 202 may include information related to a freight contract or other contracts related to freight services. For example, the contract block 202 may include the smart contract 116. The contract block 202 may be the genesis block of the blockchain 114. In other examples, other datablocks may precede the contract block 202. In many examples, the blockchain database 112 may include a separate blockchain for each contract block 202 and/or smart contract 116.

The blockchain 114 may include one or more consensus block 204. The consensus block 204 may include consensus information. The consensus information may include an indication of an approval stored on the blockchain 114. For example, the shipper 105 or the carrier 106 may propose the smart contract 116. The carrier 106 may agree with the smart contract 116. The consensus block 204 may store an indication of the agreement by the carrier 106 and/or the shipper 105. In other examples, any party may approve, disapprove, or counter the smart contract 116. Information related to the approval, disproval, and/or counter may be stored in the consensus block 204. In some examples, the logistics control stack 110 may prohibit execution of provisions of the smart contract 116 until a corresponding consensus block of the contract block 202 has been added to the blockchain 114.

The blockchain 114 may include one or more order block. The order block 206 may include information related to a freight order placed under the smart contract 116. For example, the smart contract 116 may identify multiple origin/destination combinations with associated shipping rates. The shipper 105, the carrier 106 may place an order corresponding to one of the origin/destination combinations. The carrier 106 may accept or decline the order. In some examples, the order block 206 may represent a fork in the blockchain 114. Accordingly, subsequent datablocks added to the blockchain 114 may link back to the order block 206. The blockchain 114 may include multiple forks with respective order blocks. Each of the respective order blocks may link back to the contract block 202. Alternatively or in addition, The genesis block of the blockchain 114 may contain all the contract parameters with the origin-destination combinations with associated shipping rates. The smart contract 116 may apply business logic with the contract parameters miles driven, or other information determined based don the tracking update 109, as tracked by the tracking device.

The blockchain 114 may include one or more tracking block. The tracking block 208 may include tracking information corresponding to one or more shipments. For example, the tracking block 208 may include geographical information corresponding to a geographical location of the shipment 108. Additionally or alternatively, the tracking block 208 may include metrics related to progress of the shipment 108 at a moment in time. For example, the tracking block 208 may include metrics or other information that indicates the progress the shipment 108 has made from a origin 118 and/or to a destination 120.

The blockchain 114 may include one or more transfer block. The transfer block 210 may include information related to a transfer of the shipment 108. For example, the transfer block 210 may include information that indicates that the shipment 108 has left the origin 118 and/or reached the destination 120. Alternatively or in addition, the transfer block 210 may include information that indicates that the shipment 108 is transferred from a first carrier to a second carrier. The transfer block 210 may include the account identifiers, or other identifying information, of the party that receives the shipment 108 and/or the party that releases the shipment 108. Alternatively or in addition, the transfer block may include information related to risk, liability, insurance, incoterms of one or more shipments. I The blockchain 114 may include one or more report block. The report block 212 may include a historical summary events corresponding to shipment 108. Alternatively or in addition, the report block 212 may include a summary of the obligations of a contracted party based on the events stored in the blockchain 114. For example, the report block 212 may include an invoice with one or more metrics that are calculated according to logic included in the smart contract 116. In some examples, the smart contract 116 may include layout information. The layout information may include a schema that defines how information on the invoice, or any other example of a report, may be organized. In some examples, the layout information may include a XML, HTML, or any other type of instructions configured to arrange information on an interface. The layout information may generate the report and the report may be stored in the report block 212.

The blockchain 114 may include one or more post-processing block. The post-processing block 214 may include transaction information 402 related to fulfillment of obligations of the smart contract 116. For example, the smart contract 116 may include provisions that the shipper 105 must pay the carrier 106 for transporting the shipment 108. The post-processing block 214 may include information that indicates that the shipper 105 was notified of the obligation. Alternatively or in addition, the post-processing block 214 may include information that indicates that the carrier 106 was paid for freight services rendered to the shipper 105. In other examples, the post-processing block 214 may include any information related to the notification and/or satisfaction of obligations defined in the smart contract 116.

In other examples, the blockchain 114 may include a registration block (not shown in FIG. 2) the registration block may include registration information corresponding to the tracking device 107. For example, the tracking device 107 may send a registration message comprising a device identifier to the logistics control stack 110. The logistics control stack 110 may append the registration block to the blockchain 114. The registration block may include registration information corresponding to the tracking device 107. For example, the registration block may include the device identifier of the tracking device 107.

In some examples, the one or more datablocks on the blockchain 114 may include status identifiers that are generated based on logic included in the smart contract 116. For example, the smart contract 116 may include rules for updating the status of the shipment 108. The logistics control stack 110 may execute the logic of the smart contract 116 to evaluate information on the blockchain 114 and/or other information received by the logistics control stack 110 to determine the status of the shipment 108. The logistics control stack 110 may store, on the blockchain 114, a status indicator that identifies the status of the shipment 108. The smart contract 116 may include a plurality of predefined status indicators, and the logistics control stack 110 may select one or more of the predetermined status indicators.

The logistics control stack 110 may communicate with the blockchain 114 to carry out requests received by the logistics control stack 110. Using the various types of datablocks for the blockchain 114, the logistic control stack 110 may create various blockchains, depending in the information received from devices that are configured to track the shipment 108, such as the tracking device 107 (FIG. 1). In some examples, the logistics control stack 110 may execute the smart contract 116. To create, monitor, and/or store the various types of datablocks described herein.

Figure 3:
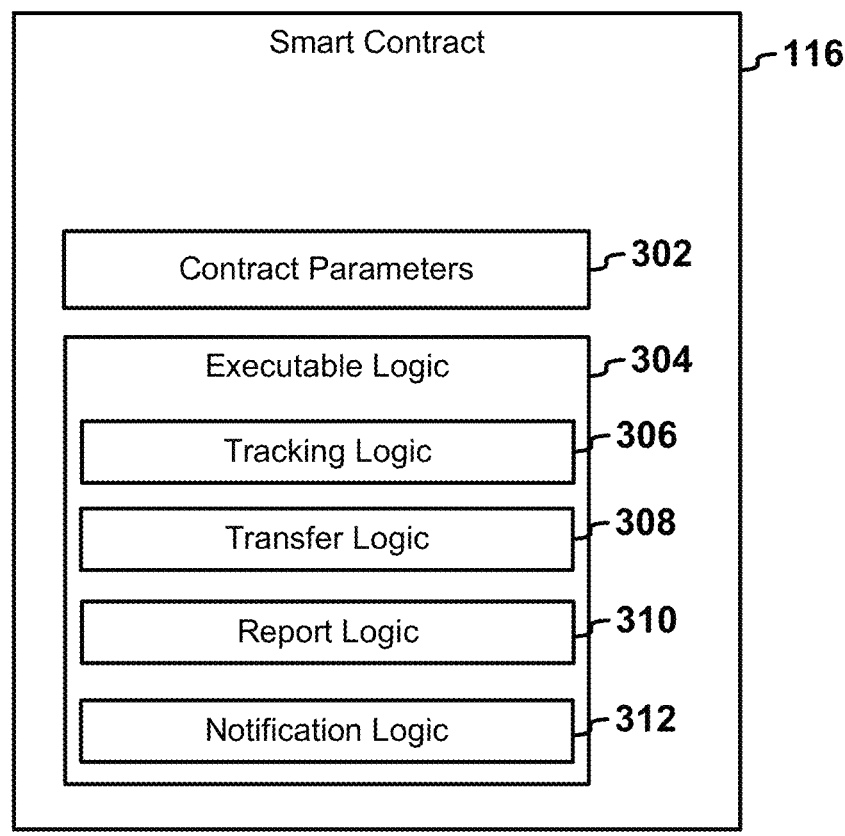
FIG. 3 illustrates an example of a smart contract for a system.

FIG. 3 illustrates an example of the smart contract 116 for the system 100. The smart contract 116 may include one or more contract parameter 302 and executable logic 304. The contract parameter 302 may include information that represents the terms and definitions of a contract. The contract parameter 302 may include a definition, a measurement metric, a threshold value, a rate value, or any other value that represents a term or a definition in the contract. Table 1 lists examples of contract parameters.

TABLE 1

Example Contract Parameters

| Contract Parameter | Description |
| --- | --- |
| Contract ID | Identifier of the contract or smart contract. |
| Carrier ID | An identifier of a carrier. |
| Shipper ID | An identifier of a shipper. |
| Origin | An identifier of an origin for a shipment. |
| Destination | An identifier of a destination for a shipment. |
| Mode | A type of transportation for the shipment. |
| Approximate. Miles | The approximate number of miles a shipment may travel under the contract. For example, the approximate miles may include an approximation of the acceptable travel distance between an origin and destination. |

TABLE 1-continued

Example Contract Parameters

| Contract Parameter | Description |
|---|---|
| Price Per Mile | Price unit per qualified mile traveled. |
| Minimum Price | The minimum cost for transporting a shipment. |
| Fuel Surcharge/Mile | Fuel cost per qualified mile traveled. |
| Free Detention Time | Amount of detention time not charged. |
| Detention Rate/Minute | Price unit per detained minute. |
| Maximum Detention | The maximum price for detention. |

The executable logic 304 may include instructions and/or rules that are representative of the terms and conditions of a contract. The executable logic 304 may include instructions to monitor for events defined in the contract. Alternatively or in addition, the executable logic 304 may include instructions to perform an action defined in the contract in response to a detected event. The executable logic 304 may be executed to implement the logic for conducting activities related to managing a distributed ledger. For example, the executable logic 304 may provide automatic calculation of rates based on the service rendered. Alternatively or in addition, track-and-trace information may be automatically evaluated by self-executing logic stored on the distributed ledger to generate and/or update invoices.

In some examples, the executable logic 304 may include tracking logic 306. The tracking logic 306 may include executable logic to calculate or update metrics related to tracking of one or more shipments. The tracking logic 306 may include logic that determines, among other metrics, a qualified distance traveled. The qualified distance traveled may include a distances traveled that are authorized by the smart contract 116. The tracking logic 306 may increase a qualified miles traveled metric for miles traveled along a travel path and/or for miles traveled within a predetermined distance from the travel path. The travel path may include a travel path between a origin location and a destination location. In some examples, the travel path may be predetermined in the smart contract 116.

The tracking logic 306 may refrain from increasing the qualified miles traveled for unauthorized detours. In one example, the tracking logic 306 may receive a current location parameter and compare the current location parameter with a predetermined authorized distance from the travel path. The tracking logic 306 may determine that the distance traveled away from, or off of, the predetermined travel path exceeds the predetermined authorized distance. The tracking logic 306 may not increase the qualified miles traveled in response to the unauthorized detour. Alternatively or in addition, the tracking logic 306 may increase an unqualified miles traveled metric.

The tracking logic 306 may determine, among other things, qualified detention time and/or idle time. Qualified detention time may include time that one or more shipments remains stationary due to backlogs or delays that are not caused by the carrier 106 while the shipment is still under carriage of the carrier. In some examples, detention applies for qualified idle time of the carrier 106. Detention may also occur while the carrier 106 is awaiting shipment pickup or at the origin site. Idle time may include time that the shipment remains stationary due to frolic or detour.

To determine the qualified detention time, the tracking logic 306 may compare the geographic location of the shipment 108 with a permitted detention area. The permitted detention area may include a geographic area that carriers are permitted to remain idle. For example, a permitted detention area may include a geographic area around a destination location, or other geographic location such as the origin. As the destination location may become backlogged by receipt of shipments, incoming shipments may remain stationary within the permitted detention area. The tracking logic 306 may increase the detention time in response to rules defined in the tracking logic 306. For example, the tracking logic 306 may receive the current geographic location of the tracking device 107, the number of available loading zones at the destination location, the amount of time the tracking device 107 has remained idle and/or other relevant information and determine, based on the rules whether idle time is qualified detention time. Alternatively or in addition, the tracking logic 306 may increase the qualified detection time in response to detection that the shipment, the carrier of the shipment, and/or the tracking device 107 is located at a well site, being transferred to another method of transportation, being loaded/unloaded, and/or any other detected causes of delay.

In other examples, the tracking logic 306 may calculate various metrics based on parameters provided to the tracking logic 306 and/or the contract parameters defined in the smart contract 116. Table 2 lists examples of the executable logic represented by pseudo code.

TABLE 2

Metric Calculations

| | |
|---|---|
| Calculate Shipping Price | shipping_price = qualified_miles_traveled * price_per_mile |
| Calculate Adjusted Freight Price | adjusted_freight_price = Max(minimum_price, shipping_cost) |
| Calculate Fuel Surcharge | fuel_surcharge = qualified_miles_traveled * fuel_surcharge_per_mile |
| Calculate Detention Time | If(qualified_detention_time > free_detention_time) then { <br> detention_time = qualified_detention_time − free_detention_time} <br> else { <br> detention time = 0 <br> } |
| Calculate Detention Surcharge | detention_Surcharge = detention_time * detention_rate |
| Calculate Adjusted Detention Surcharge | adjusted_detention_surcharge = Min(detention_cost, maximum_detention) |
| Calculate Total Freight Price | total_price = fuel_surcharge + adjusted_freight_cost + adjusted_detention_cost |

The blockchain solution's smart contract may provide algorithmic capabilities to optimize the placement and capacity of cargo in a truck trailer or shipping container. This may apply to situations in which a shipper, i.e., a customer of a transportation service provider, has less than a full truckload (LTL) or less than a full container load (LCL), and the transportation service provider may load several different customers' cargo into one discrete shipment unit, such as a full truckload (FTL) or a full container load (FCL). As trucks, vessels, planes, trains, trailers and containers have volume and weight capacity constraints, the smart contract may be programmed in conjunction with the logistics control stack to take into consideration the weights and dimensional volumes of individual shipments and consolidate them into the fewest number of trailers or containers while adhering to the physical capacity constraints of the mode of transportation and the method of transportation, e.g., trailer or container.

The logistics control stack 110 may receive weight information from the tracking device 107 and/or other sensors located on or in proximity to the shipment 108. The tracking logic 308 may store the weight information on the blockchain 114. The tracking logic 308 may calculate tracking metrics related to the weight of the shipment, including, for example, changes in the weight of the shipment and/or costs related to the weight of the shipment. For example, the tracking logic 308 may perform the following calculations for LTL shipments:

Chargeable Weight=the greater of dimensional weight or actual weight

Dimensional Weight=(Height*Width*Length)/(Dimensional shipping factor)

Shipment price=chargeable weight*rate per chargeable rate

In some examples, the chargeable weight, dimensional weight, and/or shipping price may be added to the blockchain when the shipment 108 includes an LTL shipment.

The executable logic 304 may additionally include transfer logic 308. The transfer logic 308 may include logic that determines when the shipment 108 has fulfilled obligations defined in the smart contract 116 and/or the contracted terms in the genesis block. Alternately or in addition, the shipment fulfillment is based on incoterms and the contract terms in the genesis block. For example, the transfer logic 308 may include logic, which in conjunction with the contract terms in the genesis block, that determines that shipping is complete when the shipment 108 has reached the destination and the goods receipt has been issued and the carrier is release from the shipment obligations. Alternatively or in addition, the competition logic may include logic to determine that shipping is complete in response to the shipment 108 being transferred to another carrier. In some examples, the transfer logic 308 may determine that shipping is complete in response to the shipment 108 being located at a geographic location and/or in a geographic area that corresponds to the destination. Alternatively or in addition, the transfer logic 308 may determine that shipping is complete in response to the shipment 108 being located at a geographic location and/or in a geographic area that corresponds to the destination greater than a predetermined amount of time. The predetermined amount of time may be included in the smart contract 116.

In one example, the shipment 108 may be transferred from a first carrier to a second carrier. The first carrier may include, for example, ground transportation and the second carrier may include, for example, air transportation. The transfer logic 308 may determine that the shipping is complete for the first carrier in response to the shipment 108 being transferred to a geographic area, such as a loading zone, for the second carrier. The loading zone may include a loading dock, a shipping rail, a container, or any geofenced area.

Alternatively or in addition, the transfer logic may use GPS data and geofencing to track title of goods and liability as the shipment 108 moves through different modes of transportation, e.g., at origin the shipment's liability and title of goods shift to the trucking company when the goods pass the loading dock into the trailer/container; at an ocean terminal, once the trailer/container moves over the ship's rail, the ocean carrier holds responsibility for the shipment from the trucking company. The transfer of title and liability between the carrier and the shipper are based on the agreed upon incoterms.

The executable logic 304 may include report logic 310. The report logic 310 may include logic that determines how to create, format, and/or communicate report information to external systems, users, and/or devices. Report information may include information collected from the blockchain 114 and/or information generated based on information stored in the blockchain 114. For example, the report logic 310 may include logic that collects information from one or more of the datablocks on the blockchain 114. The report logic 310 may perform additional calculations and/or modifications to the data. For example, the report logic 310 may include the tracking logic 306 including, for example, the tracking logic 306 defined in Table 2. In some examples, the report logic 310 may organize the information according to a predefined report format. In some examples, the predefined report format is created when the smart contract 116 is added to the blockchain 114 by, for example, a client device. Thus, the predefined report format may be stored in the smart contract 116, and/or any datablock on the blockchain 114. In some examples, the report logic 310 may include logic to generate an invoice. The invoice may include any of the tracking metrics previously discussed.

The executable logic 304 may additionally or alternatively include notification logic 312. The notification logic 312 may include rules that are executable to notify users and/or systems that certain events have occurred or been detected. For example, the notification logic 312 may include logic to notify a user in response to the shipment 108 remaining stationary longer than a predetermined time. Alternatively or in addition, the notification logic 312 may include logic to notify a user in response to the shipment 108 traveling too far away from a travel route. In some examples, the notification logic 312 may include logic to notify a user at the destination location that the shipment 108 will arrive. Alternatively or in addition, the notification logic may include logic to notify a user if the shipment 108 is stationary for more than a predetermined number of minutes, en route. The smart contract 116 may include identifiers, address, and contact information used to perform the notification. In addition, the smart contract 116 may include the method of notification inclining, for example, text, voice, email, or any other form of communication channel. The logistics control stack 110 may store a record of a notification on in one or more datablocks on the blockchain 114.

Alternatively or in addition, a notification may sent to user at the origin 118, the destination 120, or any other location when the truck is a certain number of minutes or miles away from the respective origin or destination. In some examples, GPS, geolocation, and blockchain functionality becomes an "air traffic control" system for the location personnel to coordinate inbound and outbound trucks, optimizing the sequence of trucks and coordinating a smooth flow of traffic.

Using the various types of datablocks, contract parameters 302, and/or executable logic 304, the blockchain 114 include various assortments of datablock.

Figure 4A:
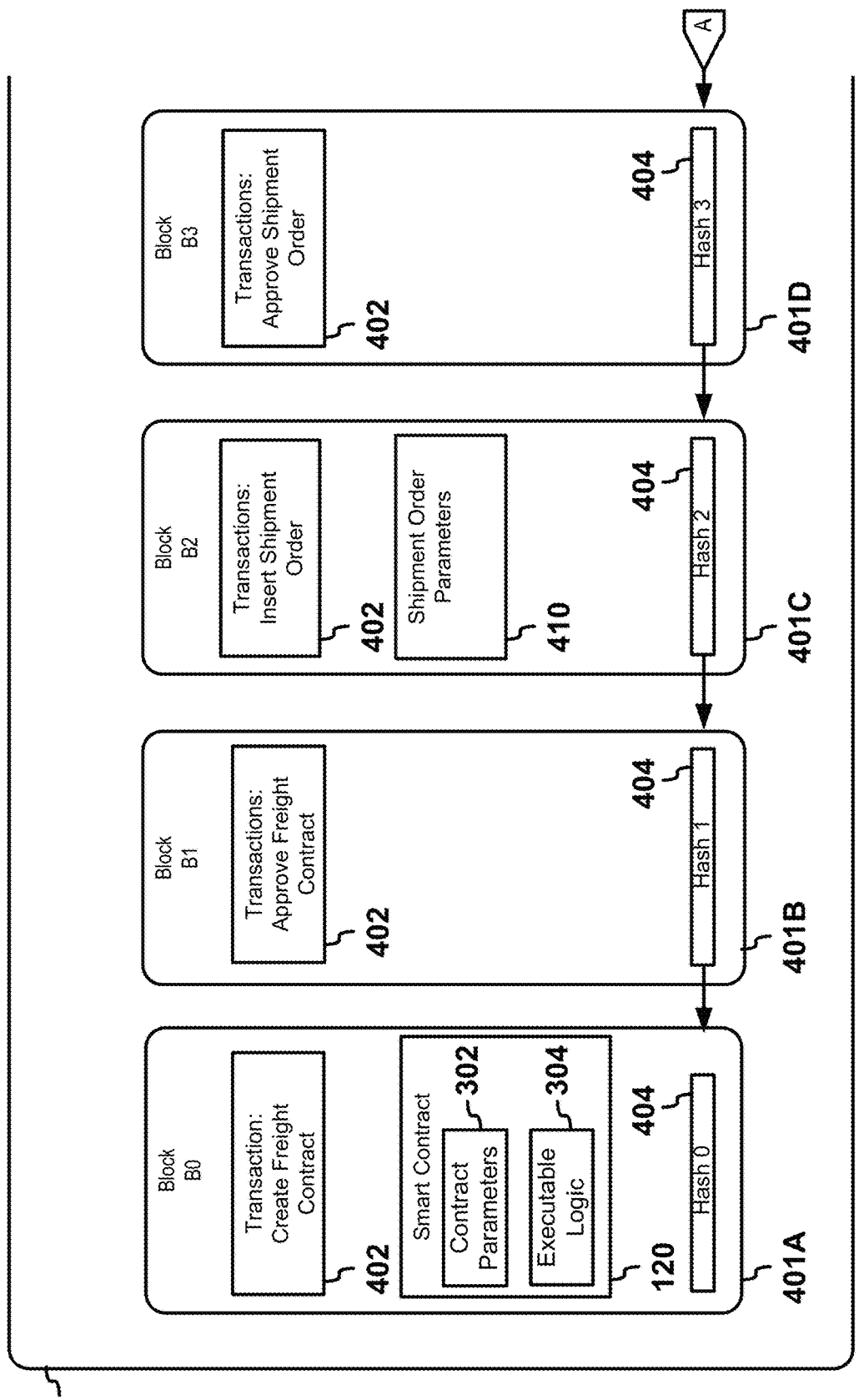
FIGS. 4A-C illustrates an example of a blockchain for a system.
Figure 4B:
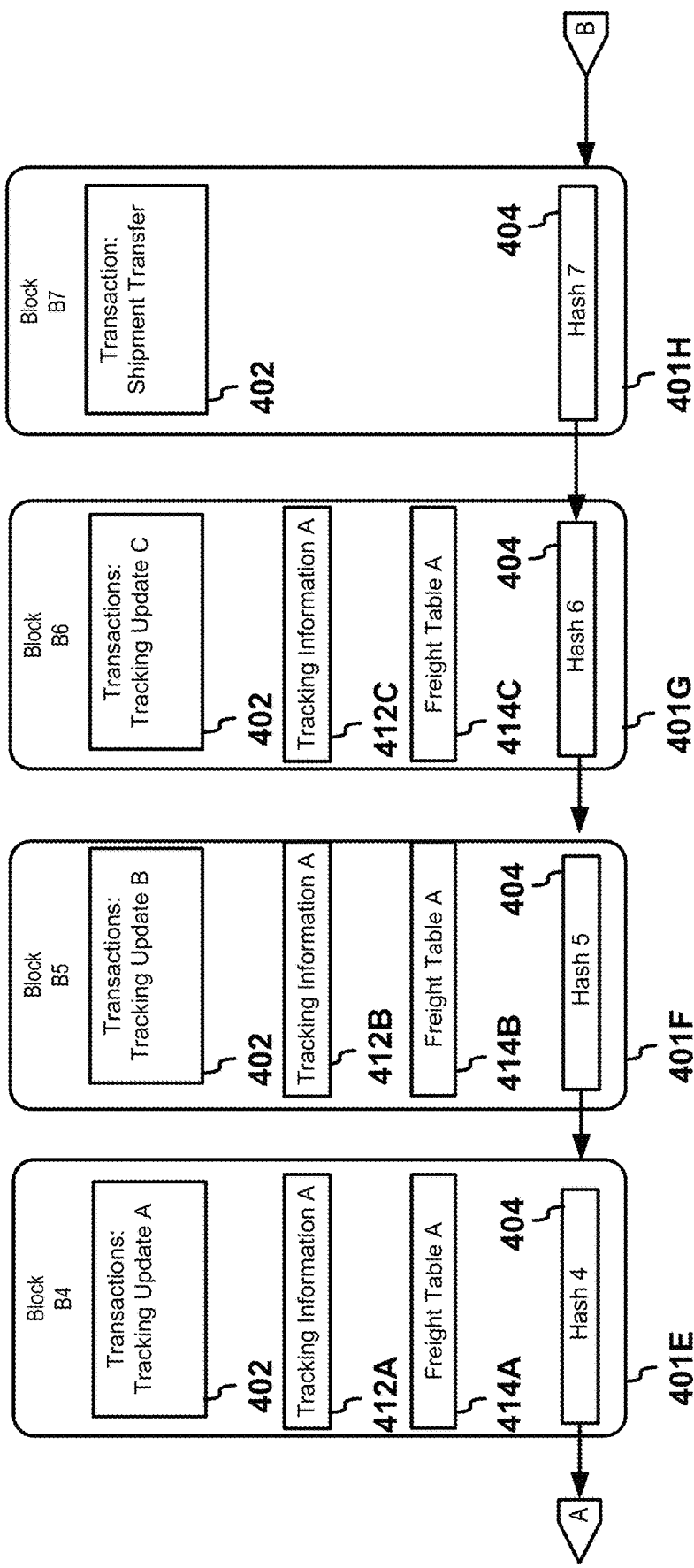
Figure 4C:
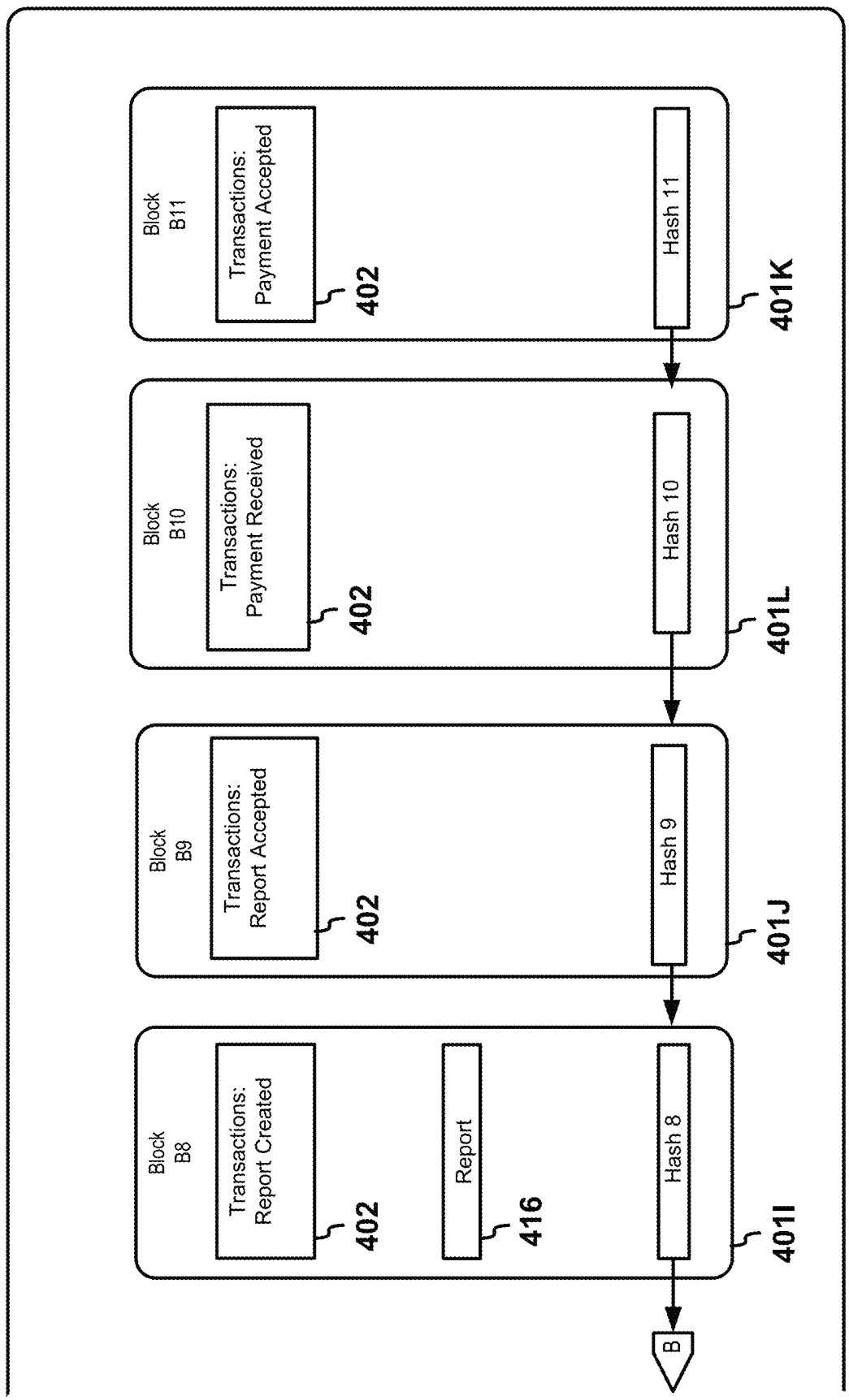

FIGS. 4A-C illustrates an example of the blockchain 114 for the system 100. The datablocks 401 (portions respectively shown in FIG. 4A, FIG. 4B, and FIG. 4C) may include transaction information 402. The transaction information 402 may include a log descriptive of an event. The event may include, for example, creation of a rate contract, approval of the rate contract, creation of a freight order, acceptance of the freight order, receipt of the tracking update 109, loading, delivery, creation of an invoice, acceptance of an invoice, payment of an invoice, check in, check out, goods issued, goods, receipt, idle time, miles driven, proof of delivery, and/or receipt of any other type of information related to the shipment 108. Alternatively or in addition, the transaction information 402 may include identifying information of an account, a time the transaction occurred, and/or any other information related to the transaction.

The datablock 401 may include an encoding 404. The encoding 404 may include an encoded version of information included in the one or more previous datablock. For example, the encoding 404 may include a hash of one or more previous datablock. Alternatively or in addition, the encoding 404 may include a pointer that includes an address of one or more previous datablock. The datablocks may be organized using a Merkle tree or any other type of data structure suitable for blockchain technology. One of ordinary skill in the art would appreciate that other variations of the blockchain 114 may exist and that the order, number, type of, and information included in the blocks of the blockchain 114 illustrated in FIGS. 4A-C may vary.

Referring to FIG. 4A, the blockchain 114 may include a first set of datablocks 401A-D. The first set of datablocks 401A-D may include a first datablock 401A. The first datablock 401A may include an example of the contract block 202 previously described in reference to FIG. 2. The transaction information 402 of the first datablock 401A may indicate that a freight contract was created on the blockchain 114. The transaction information 402 include an identifier of an account and/or user associated with the freight contract. For example, the transaction information 402 information may include the identifier of a user and/or account that caused the contract block 202 to be created.

The first set of datablocks 401A-D may include a second datablock 401B. The second datablock may include an example of the consensus block 204 previously discussed in reference to FIG. 2. The transaction information 402 of the second datablock may indicate that a party, such as the shipper 105 or the carrier 106, approves the smart contract 116. The transaction information 402 may include identifying information of the party, account, and/or user that approved the freight contract.

The first set of datablocks 401A-D may include a third datablock 401C. The third datablock 401C may include an example of the order block 206 previously discussed in reference to FIG. 2. The third datablock 401C may include shipping order parameters 410. The shipping order parameters 410 may include the details of a freight order. For example, the shipping order parameters may identify information included in the smart contract 116. For example, the shipping order parameters may include a contract identifier, a shipment identifier, an identifier of the origin and/or the destination 120 (see FIG. 1), or any other information that identifies information included in the smart contract 116.

The first set of datablocks 401A-D may include a fourth datablock 401D. The fourth datablock 401D may include a second example of the consensus block 204 previously discussed in reference to FIG. 2. The fourth datablock 401D may include transaction information 402 that indicates a party agrees to the freight order identified by the third datablock 401C. For example, the fourth datablock 401D may be created in response to the shipper 105 and/or the carrier 106 approving the freight order.

As information is stored on the blockchain 114, the smart contract 116 and/or other logic in the system 100 may detect events, perform calculations, and/or generate additional data. For example, as discussed in reference to FIG. 1, the tracking device 107 may communicate tracking updates. The tracking updates and/or information related to the tracking updates may be stored as one or more datablocks on the blockchain 114. Alternatively or in addition, the executable logic 304 of the smart contract 116 may be executed to monitor the tracking updates for events identified in by the smart contract 116. Alternatively or in addition, the executable logic 304 may create information that is stored in the datablocks 401.

Referring to FIG. 4B, the blockchain 114 may include a second set of datablocks 401E-G. The second set of datablocks blocks 401E-G may include examples of the tracking block 208 previously described in reference to FIG. 2. One or more datablock included in the second set of datablocks 401E-G may include tracking information 412A-C and/or freight tables 414A-C.

The tracking information 412A-B may include information that describes the location of the shipment 108 at a moment in time and/or over an interval of time. For example, the tracking information 412A-B may include the geographic location of the shipment 108, the number of miles traveled since the previous tracking event was appended to the blockchain 114, an amount of miles traveled from the origin location, a historical travel path of the shipment 108, and/or any other information that may identify a current location of the shipment 108 and/or where the shipment 108 has been.

The freight tables 414A-C may include tracking metrics and other information that describes the progress of the shipment 108 from the origin 118 and/or to the destination 120. The tracking metrics may be inserted directly into one or more of the freight tables 414A-C based on the tracking update 109, or other information related to the shipment 108. Alternatively or in addition, the tracking metrics may be calculated values. For example, the tracking logic 306, or other executable logic included in the smart contract 116, may generate one or more of the tracking metrics. Table 3 lists examples of information that may be included in the freight table.

TABLE 3

| Freight Table | |
|---|---|
| Qualified Miles | A number of miles that freight have been transported that qualify for services rendered under a freight contract. |
| Unqualified Miles | A number of miles that freight has been transported that do not qualify as services rendered under the freight contract including, for example, frolic and detour miles. |
| Idle Time | An amount of time the freight is idle. |
| Detention Time | The amount of time that freight is detained within a predetermined distance of an unloading or transfer site. |
| Freight Price | The price of attributed to transporting freight over a time and/or distance. |
| Detention Price | The price of detaining freight over a time period. |
| Fuel Price | The price of fuel over a distance. |
| Total Price | Total accumulated price for transporting freight. In some examples, this metric may be calculated with respect to a time or distance traveled. |

Table 3 provides a non-limiting example of the freight table. In general, the freight table may include any metric tracked over the lifecycle of the shipment 108. Alternatively or in addition, the freight table may include any information used to perform calculations of tracking metrics. For example, fuel rates, or other variable costs, may vary over the course of the shipment. The freight table may include the one or more variable costs used to calculate one or more tracking metrics. Accordingly, each of the datablock 401E-401G may information the tracking metrics, and information used to calculate the tracking metrics, at a particular moment in time. The blockchain 114 as a whole may provide a detailed historical ledger of the tracking metrics.

The blockchain 114 may additionally include an eighth datablock 401H. The eighth datablock 401H may include an example of the transfer block 210 previously discussed in reference to FIG. 1. The transaction information 402 of the eighth datablock may indicate the time, location, and/or other information related to the transfer of the shipment 108 between parities. For example, the transfer block 210 may include receipts of RFID scans or other interactions with the logistics control stack 110 by the shipper 105, the carrier 106, or other another authority.

The blockchain 114 may include information that describes how the terms and conditions of a freight contract are fulfilled after the shipment 108 has reached a destination and/or as other events related to the shipment 108 are detected.

Referring to FIG. 4C, the blockchain 114 may include a third set of datablocks 401I-L. The third set of datablocks 401I-L may include a ninth datablock 401I of the blockchain 114. The ninth datablock 401I may include an example of the report block 212 previously described in reference to FIG. 1. The ninth datablock 401I may include a report 416. The report 416 may include any information stored on the blockchain 114. Examples of the report 416 may include in invoice, a receipt, a status update, or any other type of summarization of information. For example, the report 416 may include any information included in the freight tables 414A-C Alternatively or in addition, the report 416 may include a new freight table generated for the report 416. For example, the executable logic 304 of the smart contract 116 may generate the freight table for the report 416 after the shipment 108 has reached the destination 120. Alternatively or in addition, the report 416 may include any tracking metric, contract parameter, or any other information stored on the blockchain 114.

The third set of datablocks 401I-L may include a tenth datablock 401J. The tenth datablock may include a third example of the consensus block 204 previously discussed in reference to FIG. 2. The transaction information 402 of the tenth datablock 401J may include an indication that a user approves, disapproves, or proposes a modification of the report 416. For example, the transaction information 402 of the tenth datablock 401J may include an approval, disapproval, or propose modification to an invoice.

The third set of datablocks 401I-L may include an eleventh datablock 401L. The eleventh datablock L may include an example of the post-processing block 214 previously described in reference to FIG. 2. For example, the transaction information 402 of the eleventh datablock 401L may include an indication that payment for shipping services has been received. The transaction information 402 of the eleventh datablock 401L may include a time the payment was submitted. Alternatively or in addition, the transaction information 402 of the eleventh datablock may include account information or other identification information related to the payment.

The third set of datablocks 401I-L may include a twelfth datablock 401K. The twelfth datablock 401K may include a fourth example of the consensus block 204 described in reference to FIG. 1. The transaction information 402 of the twelfth datablock 401K may indicate that the payment for shipping services was accepted.

The datablocks 401A-K may represent a history of one or more shipments throughout the lifecycle of a shipping process. It should be appreciated that the blockchain 114 described in FIGS. 4A-C is just one example of many possible blockchains and arrangement of data blocks. For example the blockchain 114 may include many datablocks for tracking one or more shipments from multiple origins to multiple destinations. Alternatively or in addition, the blockchain 114 may include multiple forks. In some examples, each of the forks may correspond to a separate freight order. For example, each fork may include separate datablocks for tracking respective shipments.

Figure 5:
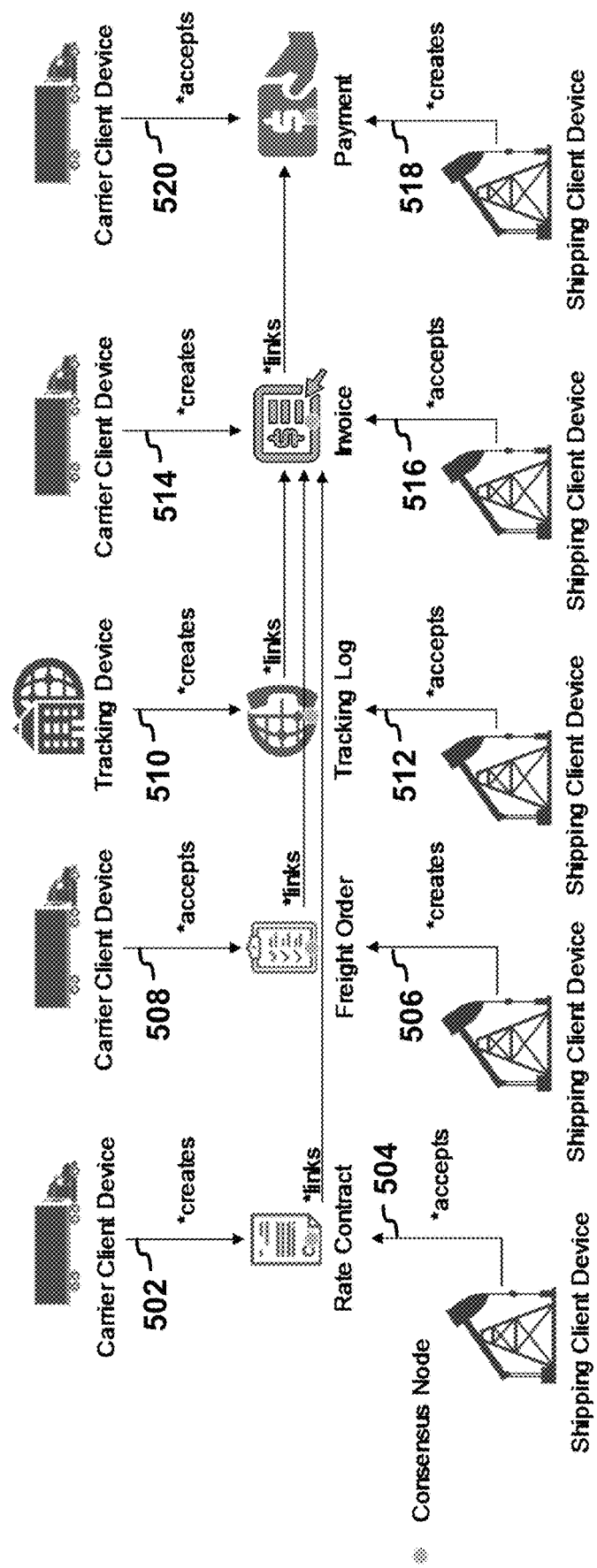
FIG. 5 illustrates an example of a use case of a system.

FIG. 5 illustrates an example of a use case of the system 100. At 502, the carrier device 104B, or any other type of electronic device in communication with one or more of the server nodes 102A-C, may cause the creation of the smart contract 116. In some examples, the logistics control stack 110 may communicate instructions, such as HTML or parameters for an application, to the carrier device 104B. The carrier device 104B may communicate parameters to the logistics control stack 110 and the logistics control stack 110 may create the smart contract 116. The logistics control stack 110 may append a contract datablock to the blockchain 114. For example, the logistics control stack 110 may cause the blockchain database 112 to append the first datablock 401A to the blockchain 114.

At 504, the shipper 105, or another party, may approve and/or deny the smart contract 116. A record of the shipper's approval or disapproval may be stored on the blockchain 114 to create a complete record of negotiation and/or modifications of the smart contract 116. The blockchain 114 may include the consensus block 204. For example, the second datablock 401B (FIG. 4B) may be stored on the blockchain 114. The second datablock 401B may include the transaction information 402 indicating the approval of the smart contract 116. Accordingly, the shipper's approval or disapproval may contribute to a growing history of data blocks that are related to the smart contract 116. In other examples, modifications to the smart contract 116, counter offers, or any other updates to the shipping smart contract may be stored on the blockchain 114. It should also be appreciated that in other examples, the shipper device 104A may create the smart contract 116. Alternatively or in addition, contract information may be imported to one or more of the server nodes 102A-C from an external system, such as a client database.

At 506, a shipper device 104A may cause a freight order to be created. The freight order may identify provisions of the smart contract 116 that were previously agreed upon between parties. The logistics control stack 110 may cause the order block 206 to be appended to the blockchain 114. For example, the third datablock 401C (FIG. 4A) may be added to the blockchain 114. The third datablock 401C may include the shipping order parameters 410. The shipping order parameters may define, among other information, the origin 118 of the shipment 108, the destination 120 of the shipment 108, a description of the shipment 108, a delivery time, a job identifier, and other details related to the shipment 108 described herein.

At 508, the carrier 106 may accept the freight order. For example, the carrier device 104B may communicate with the logistics control stack 110 and/or the blockchain database 112 to store a datablock on the blockchain 114 that indicates that the shipper 105 accepted the freight order. The logistics control stack 110 may cause another consensus block 204 to be added to the blockchain 114. For example, the logistics control stack 110 may append the fourth datablock 401D (FIG. 4A) to the blockchain 114. Alternatively or in in addition, the carrier 106 may reject the freight order. Any interaction with the freight order may be appended on the blockchain 114 as a datablock added to a growing list of transaction.

At 510, the tracking device 107 may communicate the tracking update 109 to one or more of the server nodes 102A-C. The tracking update 109 may include information that identifies the geographic location of one or more shipments identified in the smart contract 116 and/or the shipping order parameters 410. As the geographic information is received from the tracking device 107, the executable logic 304 included in the smart contract 116, or any other smart contract on the blockchain 114, may process the tracking update 109. One or more tracking blocks may be appended to the blockchain 114. For example, the datablocks 401E-G (FIG. 4B) may be appended to the blockchain 114 in response to receiving one or more tracking updates.

At 512, the shipper device may respond to notifications and other information generated by the logistics control stack 110. For example, the logistics control stack 110 may monitor the blockchain 114 and/or information received from the tracking device 107, the terminal devices 104A-B, and/or external systems. In some examples, the logistics control stack 110 may execute the executable logic 304 of one or more smart contracts stored on one or more blockchains. For example, the logistics control stack 110 may execute the notification logic 312 of the smart contract 116 to generate notifications. The logistics control stack 110 may send the notification to users, accounts, or other recipients identified in the smart contract 116. In some examples, the shipper device 104A may communicate an acknowledgement to the information received.

At 514, the carrier device 104B may cause a report to be created on the blockchain 114. For example, the carrier device 104B may receive display instructions from the logistics control stack 110 to display the current status of one or more shipments. A user may determine that the shipment 108 is completed and cause an invoice, or any other example of the report 416, to be created. The invoice may be stored on the blockchain 114. For example, the invoice may be included in the ninth datablock 401I (FIG. 4C) and appended to the blockchain 114. Alternatively or in addition, the logistics control stack 110 may monitor the blockchain 114 and/or information received to determine whether to generate an invoice. For example, the logistics control stack 110 may execute transfer logic 308, or any other example of executable logic 304 (FIG. 3), to determine how and when to generate the invoice.

At 516, the shipper device may accept the invoice, or other type of report. For example, the logistics control stack 110 may receive a confirmation the shipper 105 received in the invoice. Alternatively or in addition, the shipper device 104A may approve the invoice and the logistics control stack 110 may receive an approval message. The logistics control stack 110 may append, to the blockchain 114, another consensus block 204 that describes acceptance of the invoice. For example, the tenth datablock 401J (FIG. 4C) may be added to the blockchain 114. In other examples, adjustments, modifications, rejections, and other dispositions related to the invoice may be appended to the blockchain 114.

At 518, the shipper device may cause one or more post-processing datablock to be appended to the blockchain 114 that is representative of payment for services rendered. For example, the shipper device 104A and/or a payment system may communicate payment information to the logistics control stack 110. The payment information may represent payment for shipping services rendered. For example, the eleventh datablock 401L (FIG. 4C) may be added to the blockchain 114. At 320, the shipper device 104A may accept and/or confirm payment and another consensus block 204 that indicates payment was accepted and/or confirmed may be added to the blockchain 114. For example, the twelfth datablock 401K (FIG. 4C) may be added to the blockchain 114.

Figure 6:
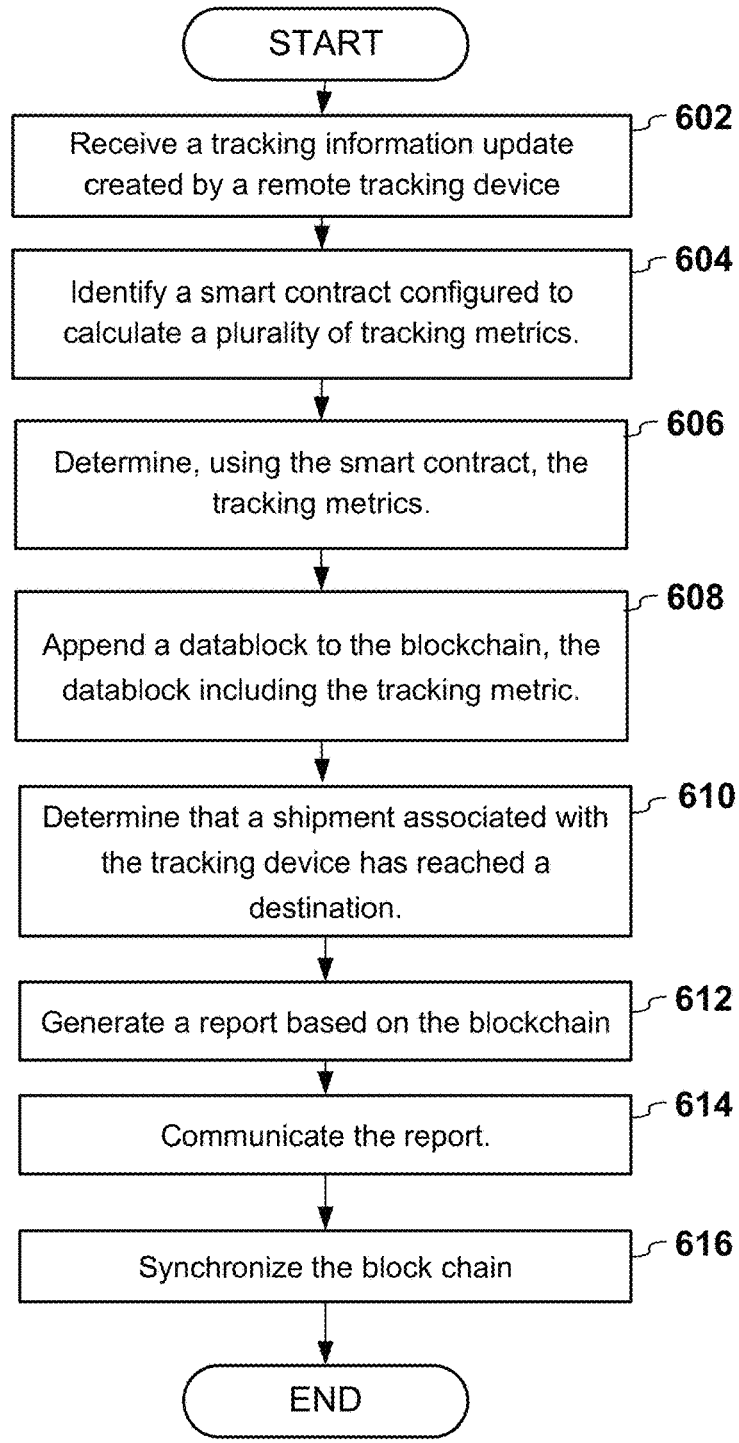
FIG. 6 illustrates a first example of flow logic for a system.

FIG. 6 illustrates a first example of flow logic for the system 100. The logistics control stack 110 may receive the tracking update 109 (602). The tracking update 109 may be created by the tracking device 107. The logistics control stack 110 may identify the smart contract 116. The smart contract 116 may include executable logic and/or instructions configured to calculate one or more tracking metrics (604).

The logistics control stack 110 may determine, using the smart contract 116, the tracking metrics (606). For example, the logistics control stack 110 execute the tracking logic 306, or other executable logic included in the smart contract 116. In some examples, the logistics control stack 110 may execute the tracking logic 306, or other examples of executable logic, in response to receipt of the tracking update 109. More generally, as the tracking device 107 and/or other devices send information to the logistics control stack 110, the executable logic 304 may cause datablocks to be appended to the blockchain 114. The datablocks may include information generated according to the executable logic 304. In one examples, to determine the tracking metrics, the logistics control stack 110 may identify a previous datablock appended in the blockchain 114, the previous datablock including a previous geographic location information. The logistics control stack 110 may apply the current geographic location information and the previous geographic location information to the tracking logic 306. For example, the tracking logic 306 may include a procedure, formula, or some other algorithm that receives parameters. The logistics control stack 110 may calculate the tracking metric based on a comparison of the geographic location information included in the datablock and/or the previous geographic location information included in the previous datablock.

The logistics control stack 110 may append a datablock to the blockchain 114, the datablock including the tracking metric (608). Alternatively or in addition, the datablock may include the geographic location information corresponding to the current geographic location of the tracking device 107. In some examples, the logistics control stack 110 may identify, in a previous datablock of the blockchain 114, a tracking table, for example one or more of the tracking tables 414A-C (FIG. 4B). The logistic control stack 110 may update the tracking table with the tracking metric. Alternatively or in addition, the logistics control stack 110 may generate an updated tracking table. The logistics control stack 110 may include the updated tracking table in the datablock. The updated tracking table may include an updated tracking metric calculated based on a comparison of the previous datablock and the tracking update 109 provided by the tracking device 107.

The logistics control stack 110 may determine that the shipment 108 associated with the tracking device 107 has reached the destination 120 (610). The logistics control stack 110 may determine that one or more conditions identified in the smart contract 116 are fulfilled and/or satisfied. For example, the logistics control stack may determine the tracking device 107 has remained stationary for a predetermined amount of time included in the smart contract 116. Alternatively or in addition, the logistics control stack 110 may determine that the tracking device 107 is positioned in a geographic area identified by the smart contract 116. As previously discussed, the executable logic 304 of the smart contract 116 may include, in some examples, transfer logic 308. The logistics control stack 110 may execute the transfer logic 308 (610). For example, the logistics control stack 110 may execute the transfer logic 308 in response to receipt of the tracking update 109 to determine that the shipment has reached the destination 120.

The logistics control stack 110 may generate the report 416 (FIG. 4C) based on information included in the blockchain 114 (612). For example, the report may include one or more tracking metric. In one example, the report 416 may include an invoice including any of the tracking metrics described herein. The logistics control stack 110 may generate the report 416 in response to determination the shipment 108 has reached the destination.

The logistics control stack 110 may communicate the report 416 (614). For example, the logistics control stack 110 may communicate the report 416 to a recipient. The recipient may be identified in the smart contract 116, or in any datablock on the blockchain 114. In some examples, the logistics control stack 110 may generate a link configured to cause a remote device to display an interface. The interface may include the tracking metric.

The logistics control stack 110 may synchronize the blockchain 114 (616). For example, the logistics control stack 110 may synchronize the blockchain 114 with a plurality of blockchains stored in databases remote to the server node. The logistics control stack 110 may receive and/or communicate a blockchain synchronization message to one or more remote server nodes. The blockchain synchronization message may include all, or a portion of the blockchain 114. For example, a new datablock may be appended to the blockchain 114 and the blockchain synchronization message may include the new datablock. In some examples, synchronization of blockchain 114 may include restricting edits to datablocks without the consent of other server nodes. For example, the blockchain database 112 may require the consent of a majority of server nodes before it will permit a modification to a datablock.

Figure 7:
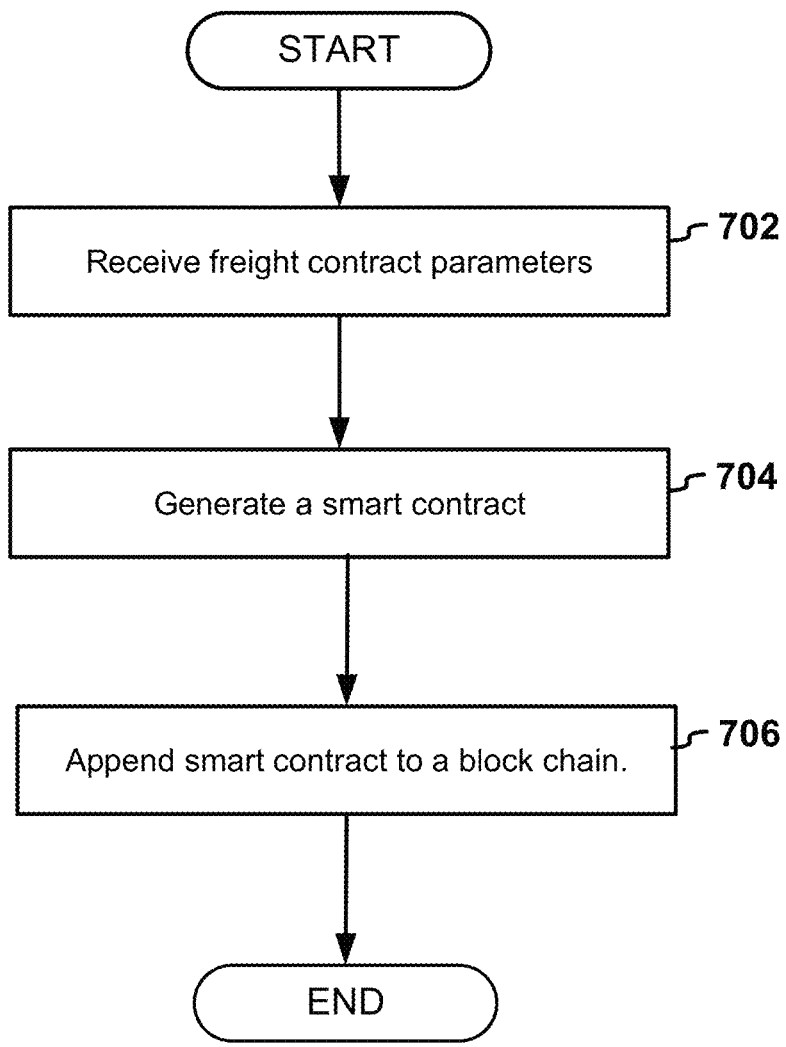
FIG. 7 illustrates a second example of flow logic for a system.

FIG. 7 illustrates a second example of flow logic for the system 100. The logistics control stack 110 may receive freight contract parameters (702). For example, one or more of the terminal devices 104A-B may communicate the freight contract parameters to one or more server node. The freight contract parameters may include the contract parameter 302 previously discussed in reference to FIG. 1 and/or the executable logic 304.

The logistics control stack 110 may generate the smart contract 116 in response to receipt of the freight contract parameters (704). The logistics control stack 110 may store the smart contract 116 in a datablock (706). In some examples, the logistics control stack 110 may create the blockchain 114 for the smart contract 116 and store the smart contract 116 in the genesis datablock of the blockchain 114. For example, the blockchain database 112 may include a plurality of blockchains with respective genesis blocks. The respective genesis blocks may include respective smart contracts.

In some examples, the logistics control stack 110 may interact with the tracking device to configure the tracking device. The configuration of the tracking device may be stored on the blockchain. For example, the logistics control stack 110 may update the tracking device with shipping identifiers, destination information, routing information, account information corresponding to the carrier 106, and/or any other information pertaining to the shipment 108 or additional shipments that the tracking device 107 may track.

Figure 8:
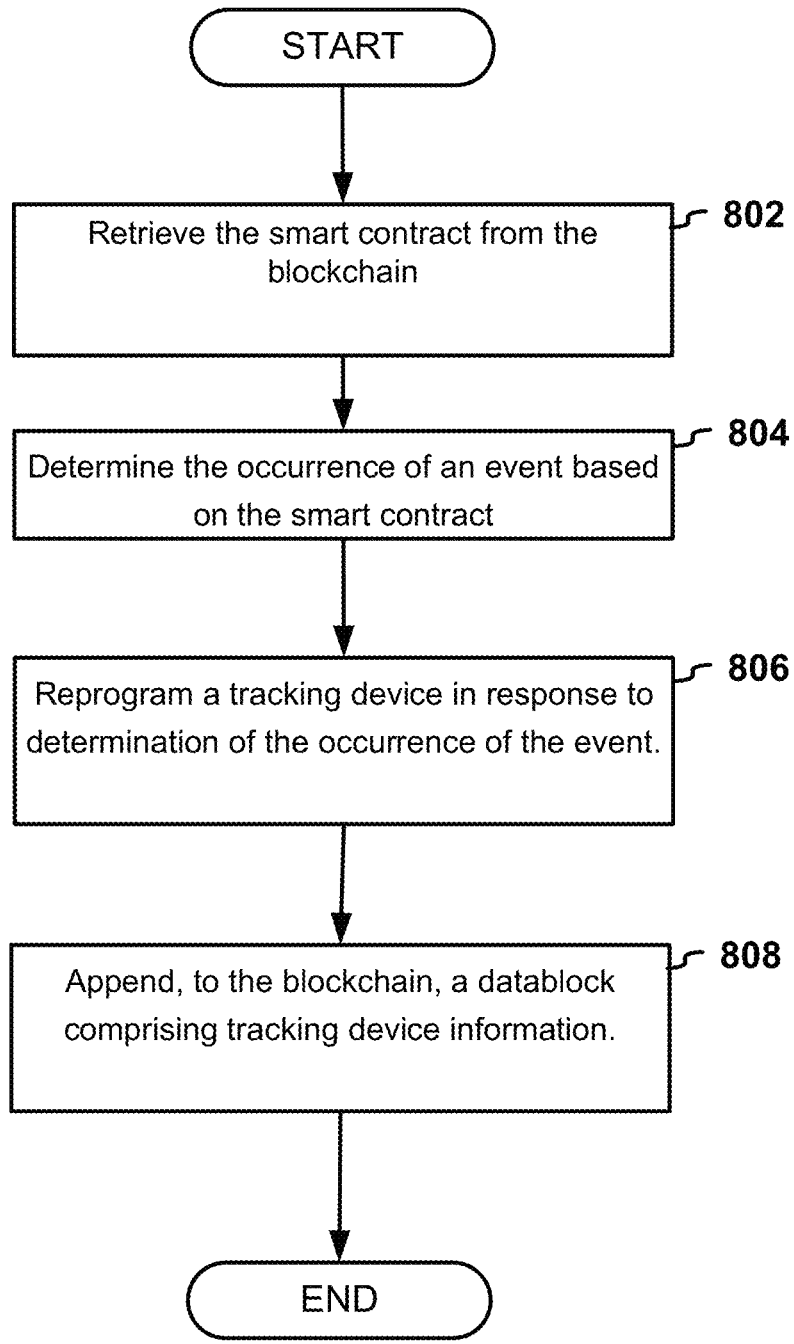
FIG. 8 illustrates a third example of flow logic for a system.

FIG. 8 illustrates a third example of flow logic for the system 100. The logistics control stack 110 may retrieve the smart contract 116 from the blockchain 114 (802). The logistics control stack 110 may determine the occurrence of an event based on the smart contract 116 (804). For example, the executable logic 304 of the smart contract may be executed with other information to determine the shipment 108 was transferred to the carrier 106. Alternatively or in addition, the executable logic 304 of the smart contract may be executed with other information to determine that the shipment 108 was transferred from the carrier to a destination 120. Alternatively or in addition, the logistic control stack may determine of any occurrence of an event related to the shipment 108 and/or services rendered for the shipment 108.

The logistics control stack may reprogram the tracking device 107 in response to determination of the occurrence of the event (806). For example, the logistics control stack 110 may communicate to the tracking device 107 a registration message. The registration message may include an identifier of the blockchain, the smart contract, and/or any other information associated with the blockchain. Alternatively or in addition, the registration message may include authentication information that permits the tracking device to communicate with one or more of the server nodes 102A-C and/or the blockchain 114. The authentication information may be associated with the shipper 105 and/or another authority. The tracking device 107 may include information from the registration message in the tracking update 109. The logistics control stack may permit and/or deny modifications to the blockchain 114 based information from the registration message.

Alternatively or in addition, the control message may instruct the tracking device to start and/or stop the communication of tracking updates. For example, the logistics control stack 110 may communicate the contract parameters 302, the executable logic 304, and/or other information included in the smart contract 116 to the tracking device 107. Since the executable logic 304 may be self-executing and agnostic to the hardware or software constraints imposed by the tracking device 107, the executable logic may execute on any kind of tracking device. The executable logic 304 may inform the tracking device when to start tracking, stop tracking, or the types of information the logistic control stack 110 expects.

In another example, the control message may instruct the tracking device to modify a travel route, a departure time from the origin 118 and/or an arrival time at a destination 120. For example, the logistics control stack 110 may operate as a traffic control system that monitors one or more blockchain for tracking information received from tracking devices. The logistics control stack 110 may determine traffic patterns, bottlenecks, and scheduled loading/unloading times based on the information stored in one or more blockchains. Alternatively or in addition, the logistics control stack 110 may determine modifications to the travel route, departed time, and/or arrival time based on information stored in one or more blockchains. The logistics control stack 110 may communicate the modifications via a control message sent to one or more tracking device or another electronic device in communication with an operator for the shipment 108.

The logistics control stack 110 may append, to the blockchain 114, a datablock comprising the tracking device information (808). The tracking device 107 information may include the registration message, the control message, and/or any other configuration of the tracking device 107. Accordingly, the blockchain 114 may include a record of how the tracking device 107 was programmed and/or which tracking device was used to track the shipment 108.

Figure 9:
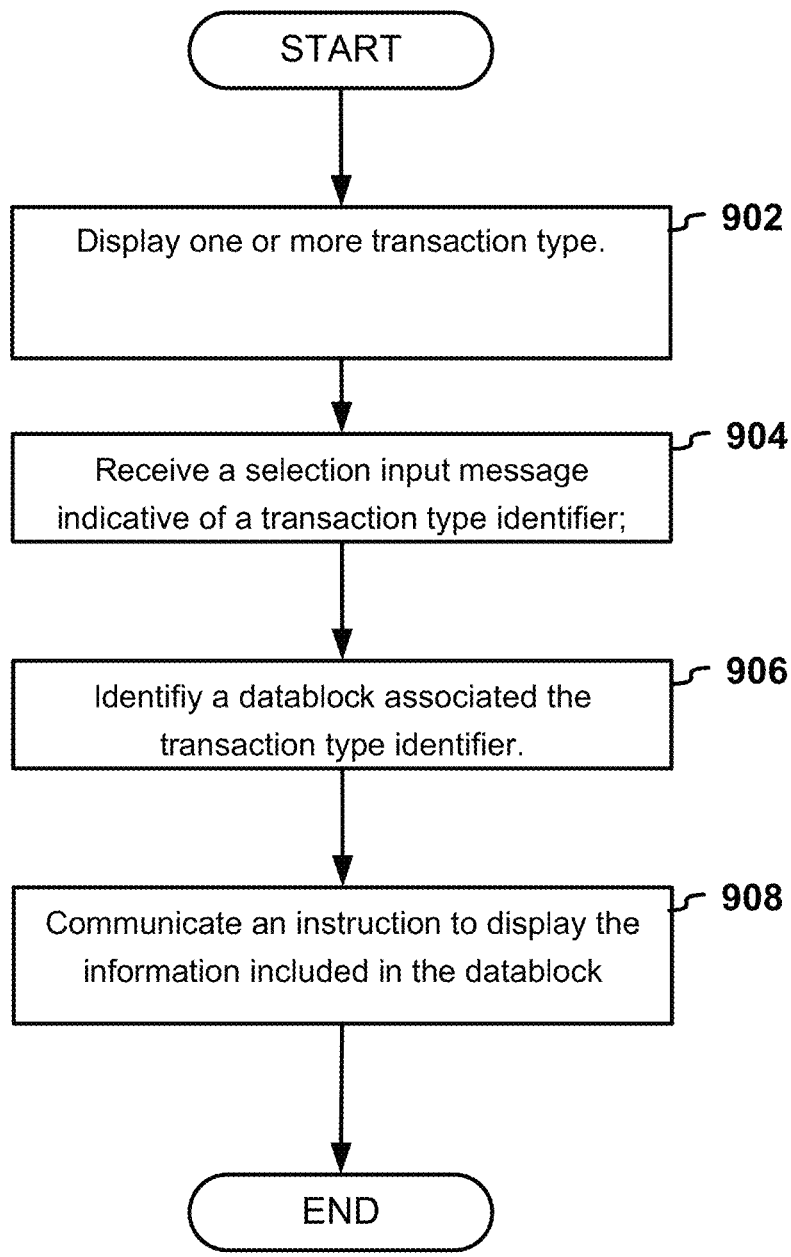
FIG. 9 illustrates a fourth example of flow logic for a system.

FIG. 9 illustrates a fourth example of flow logic for the system 100. The logistics control stack 110 may display one or more transaction type (902). For example, the display interface may communicate an instruction to display the one or more transaction type. In some examples, the logistics control stack 110 may generate a display interface including one or more labels associated with respective transaction type identifiers.

The logistics control stack 110 may receive a selection input message (904). The selection input message may be indicative of one or more of the respective transaction type identifiers. For example, the selecting input may include a signal directed to one or more transaction type identifiers displayed on the display interface.

The logistics control stack 110 may identify a datablock associated with the transaction type identifier (906). The logistics control stack 110 may display the information included in the datablock (908). For example, the logistics control stack 110 may display the smart contract 116 (FIG. 1), the shipping order parameters 410 (FIG. 4A), one or more freight tables 414A-B (FIG. 4B), tracking information 412A-C, transaction information 402, the report 416 (FIG. 4C), and/or any other information that may be included in the blockchain 114 as described herein.

Figure 10A:
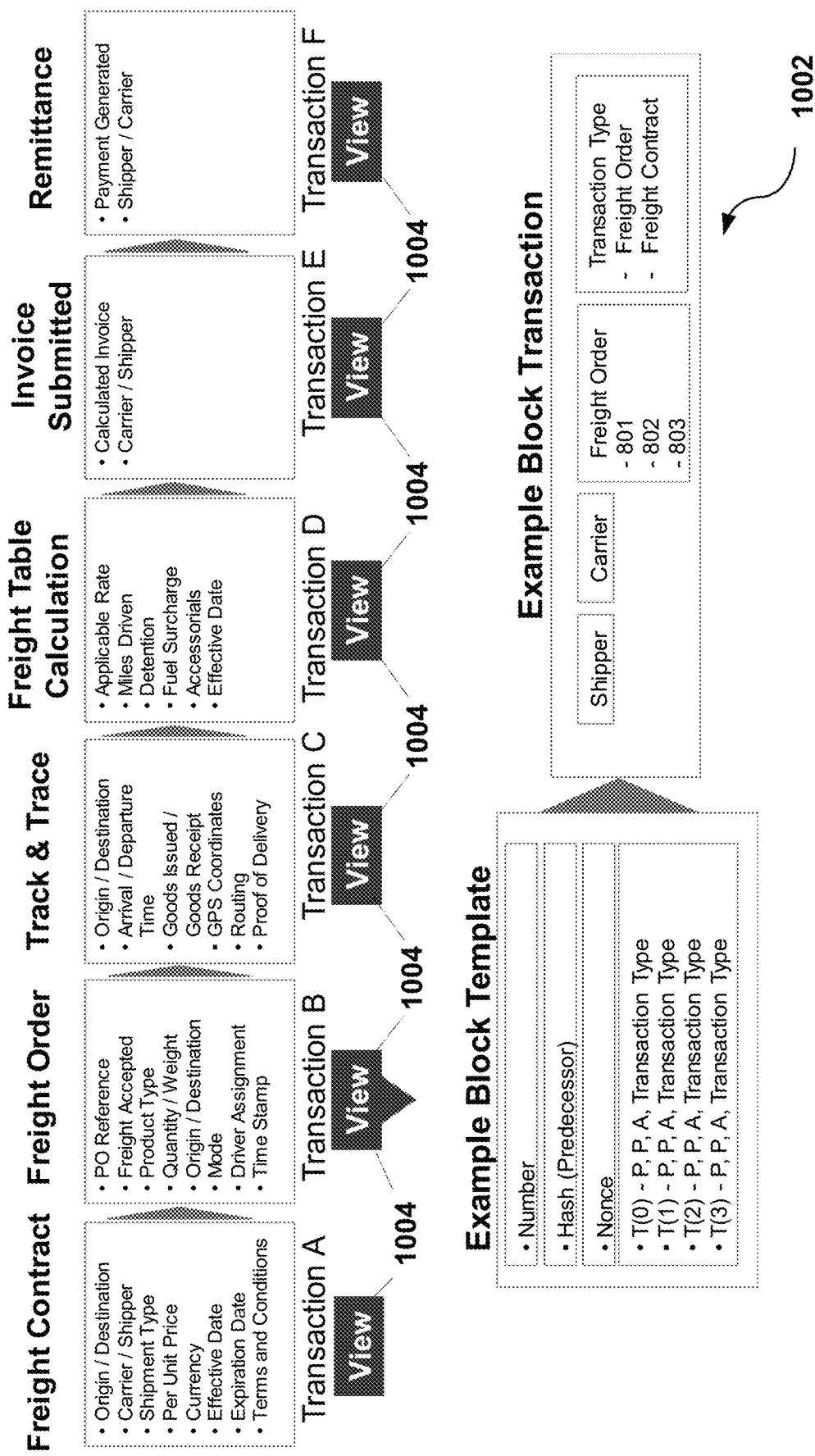
FIG. 10A-B illustrates a first example of a display interface for a system.
Figure 10B:
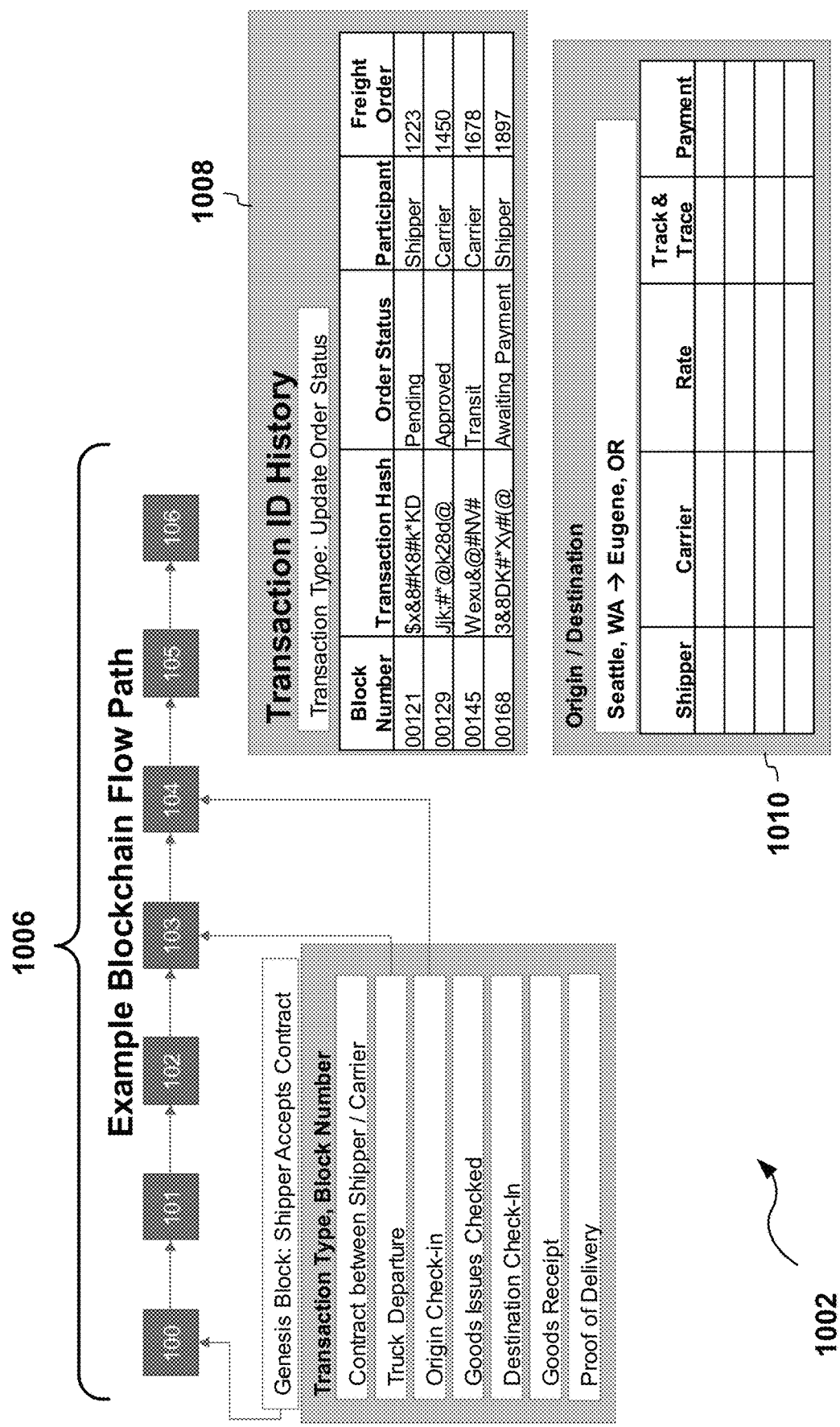

FIG. 10A-B illustrates a first example of a display interface 1002 for the system 100. Referring to FIG. 10A, the display interface 1002 may include selectable icons, buttons, text, or any other type of selectable information. For example, the display interface 1002 may include one or more labels 1004 associated with datablock types. Selecting any of the labels 1004 may display one or more datablocks of a type corresponding to the labels 1004. The discussion in reference to FIG. 1 describes various types of data blocks. Selection of one or more of the labels 1004 may result in block chain information being displayed for one or more datablocks. Referring to FIG. 10B, the display interface 1002 may, in some examples, show a blockchain flow path 1006. The blockchain flow path 1006 may include selectable blocks that may be selected to display information related to the selectable datablocks. The blockchain flow path 1006 may illustrate multiple datablocks linked together in accordance with the blockchain stored in the blockchain database 112. Alternatively or in addition, the display interface 1002 may include a transaction history table 1008 that displays historical transactions that occur on the blockchain 114. In some examples, datablock, transactions, and/or orders may be filtered based on origin/destination pairs. For example, the display interface 1002 may include table that allows information on the blockchain 114 to be filtered based on the origin/destination and/or any other parameter stored in the smart contract 116 or blockchain 114. FIG. 11 illustrate a second example of the display interface 1002 for the system 100. The logistics control stack 110 may display the display interface 1002 and/or communicate the display interface to one or more of the terminal devices 104A-B. The terminal devices 104A-B may interact with the display interface 104A-B as described below.

In one example, the shipper device 104A may log into the logistics control stack 110. The shipper device 104A may have an account managed or accessed by the logistics control stack 110. The shipper device 104A may display contracts made between the shipper 105 and one or more carriers. For example, the display include a table displaying one or more smart contract and/or contract identifier. In some examples, each row may correspond to a separate and distinct blockchain. Alternatively or in addition, each row may include information from one or more datablock in the blockchain 114.

Figure 12:
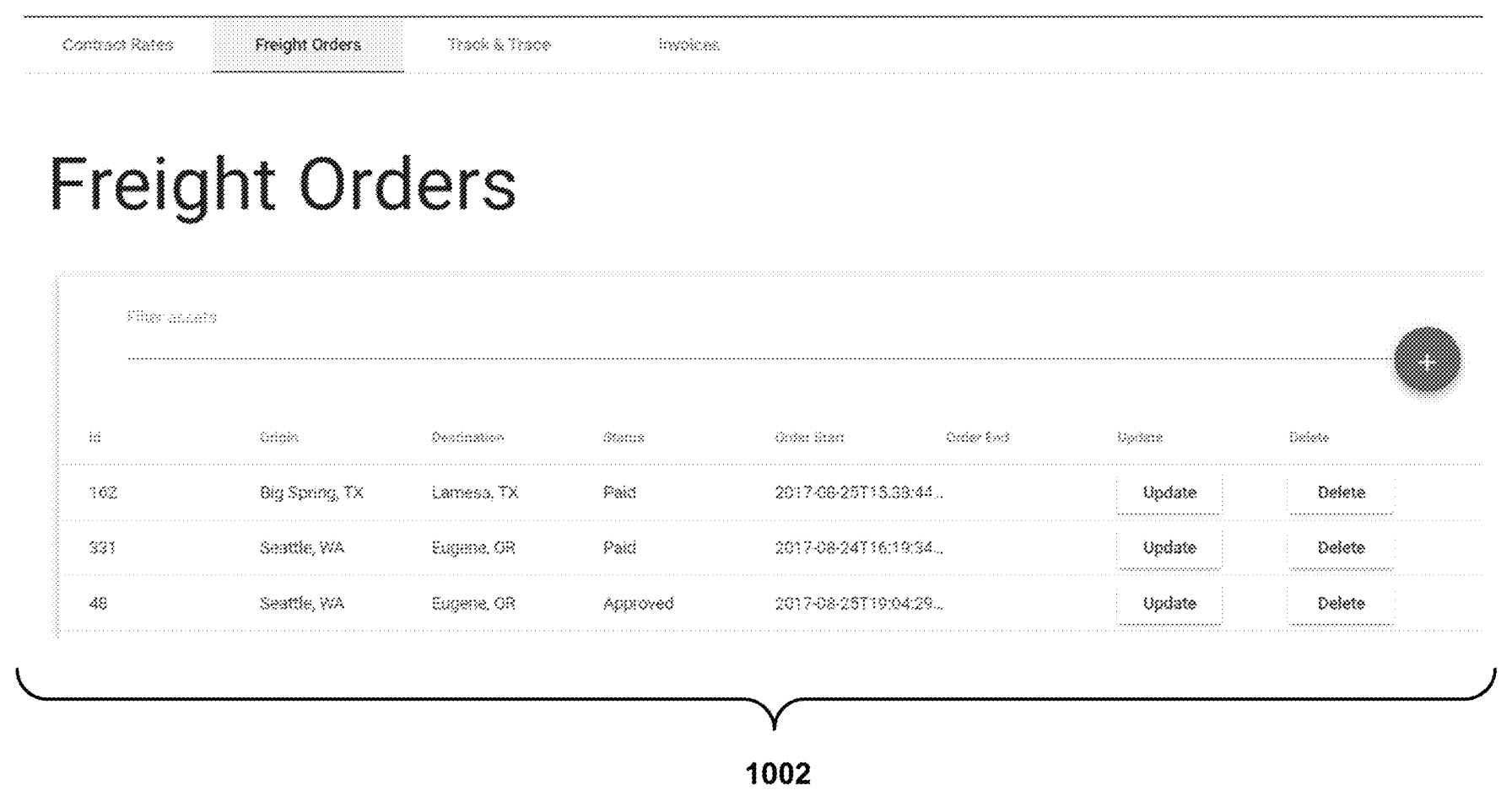

FIG. 12 illustrates a third example of the display interface 1002 for the system 100. The display interface 1002 may display shipping orders and/or respective status of the shipping orders. The respective statuses of the orders may be updated based on information stored in the blockchain 114. In some examples, the status information may be stored in a datablock on the blockchain 114. In other examples, the logistics control stack 110 may search the blockchain for one or more consensus datablock corresponding to an event. For example, the status "Approved" may refer to a consensus datablock being added to the blockchain 114 that indicates the smart contract 116 was approved.

FIG. 13 illustrates a fourth example of the display interface 1002 for the system 100. As illustrated in FIG. 13, statuses corresponding to shipments are in sync and any updates are made real time. A user may be able to select one or more of the freight orders. The display interface 1002 may prompt the user to either accept or reject the order. When the user accepts or rejects the order, the logistics control stack 110 may append a datablock to the blockchain 114 indicative of the acceptance or rejection. For example, the logistics control stack 110 may append the consensus datablock, described in reference to FIG. 1, to the blockchain 114.

The display interface may additionally include an assign button. The assign button may enable a user to assign a driver to the shipment order. When a driver is selected, the logistic control stack 110 may append a datablock to the blockchain 114 that indicates the driver was assigned to the freight order. Alternatively or in addition, the logistics control stack 110 may append a datablock to the blockchain 114 indicating that the status of the freight odder has changed. For example, the status of the freight order may change to "In Transit" when a driver is assigned to the freight order.

The system may be implemented with additional, different, or fewer components. The logic illustrated in the flow diagrams may include additional, different, or fewer operations than illustrated. The operations illustrated may be performed in an order different than illustrated. The system 100 may be implemented with additional, different, or fewer components than illustrated.

Figure 14:
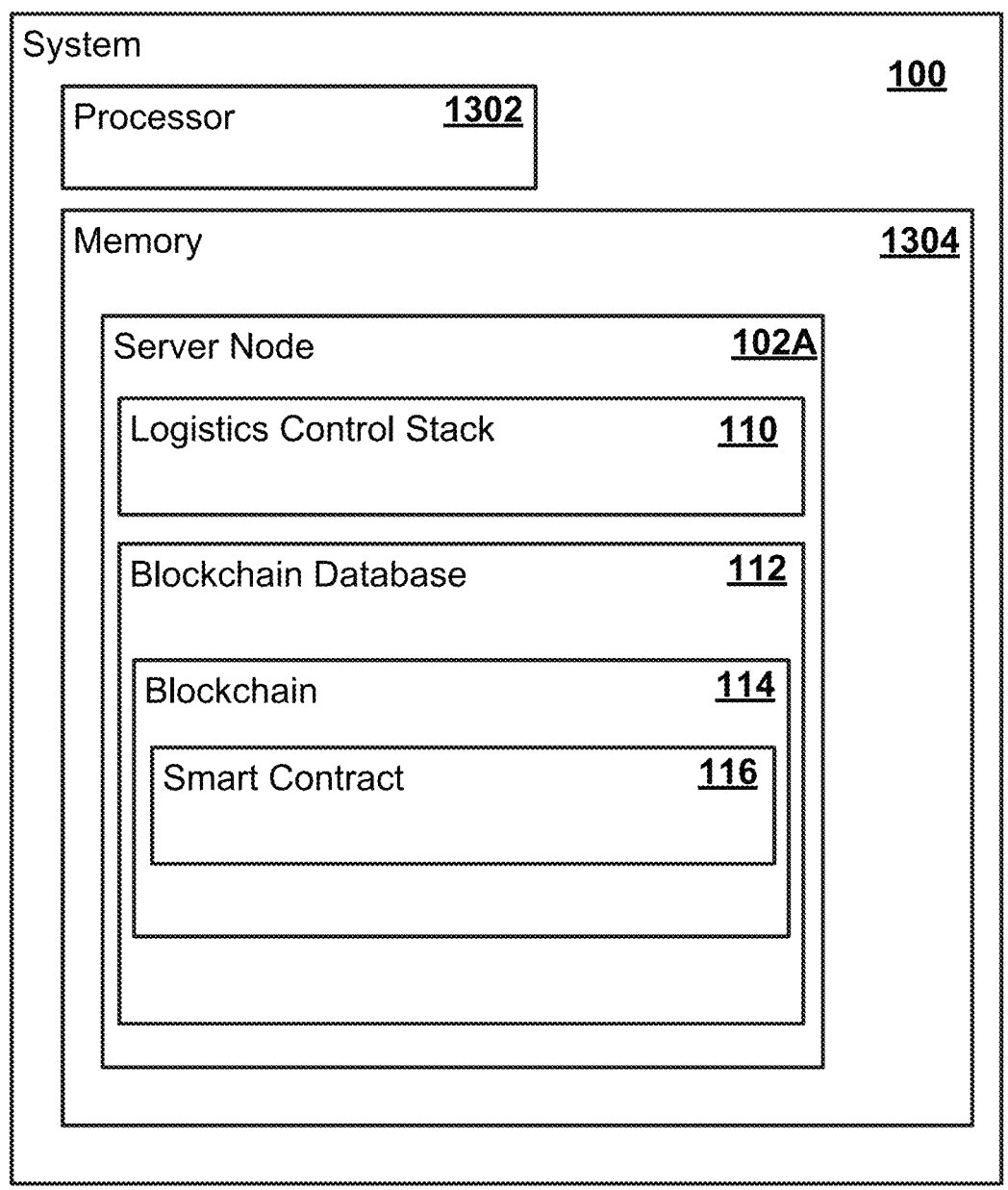
FIG. 14 illustrates an example of a system.

FIG. 14 illustrates an example of the system 100. The system 100 may include a processor 1302 and a memory 1304. The processor 1302 may be in communication with the memory 1304. In one example, the processor 1302 may also be in communication with additional elements, such as a network interface (not shown). Examples of the processor 1302 may include a general processor, a central processing unit, a microcontroller, a server, an application specific integrated circuit (ASIC), a digital signal processor, a field programmable gate array (FPGA), and/or a digital circuit, analog circuit, or some combination thereof.

The processor 1302 may be one or more devices operable to execute logic. The logic may include computer executable instructions or computer code stored in the memory 1304 or in other memory that when executed by the processor 1302, cause the processor 1302 to perform the features implemented by the logic the system 100. The computer code may include instructions executable with the processor 1302.

The memory 1304 may be any device for storing and retrieving data or any combination thereof. The memory 1304 may include non-volatile and/or volatile memory, such as a random access memory (RAM), a read-only memory (ROM), an erasable programmable read-only memory (EPROM), or flash memory. Alternatively or in addition, the memory 1304 may include an optical, magnetic (hard-drive) or any other form of data storage device.

The memory 1304 may include at least one the components in the system, including, for example, one or more of the server nodes 102A-C, the logistics control stack 110, the blockchain database 112, the blockchain 114, the smart contract 116, and/or any other subcomponent described herein. In addition, the memory 1304 may include any other component previously discussed and/or other components of the system 100 described herein.

The system 100 may be implemented in many different ways. For example each component of the system 100 may include a circuit or circuitry. Each circuit or circuitry may be hardware or a combination of hardware and software. The circuitry may include the system 100, and/or other components and subcomponents of the system described herein. For example, the circuitry may include the logistics control stack 110, the blockchain database 112, the blockchain 114, the smart contract 116, and/or any other component or subcomponent described herein. For example, each circuit or circuitry may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each circuitry may include memory hardware, such as a portion of the memory 1304, for example, that comprises instructions executable with the processor 1302 or other processor 1302 to implement one or more of the features of the circuitry. When any one of the circuitry includes the portion of the memory 1304 that comprises instructions executable with the processor 1302, the circuitry may or may not include the processor 1302. In some examples, each circuitry may just be the portion of the memory 1304 or other physical memory that comprises instructions executable with the processor 1302 or other processor to implement the features of the corresponding circuitry without the circuitry including any other hardware. Because each circuitry includes at least some hardware even when the included hardware comprises software, each circuitry may be interchangeably referred to as a hardware circuitry.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, the processor 1302 may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A method, comprising:
receiving, by a server node in communication with a blockchain database, a vehicle tracking update created by a vehicle tracking device, the vehicle tracking update comprising geographic location information indicative of a geographic location of the vehicle tracking device;
identifying, in a blockchain stored in a database, a smart contract including a destination identifier and executable logic configured to determine a tracking metric;
determining the tracking metric in response to receipt of the vehicle tracking update by calculating, using the executable logic, the tracking metric based on a comparison of the geographic location information of the vehicle tracking update and previous geographic location information included in a previous datablock of the blockchain;
appending a datablock to the blockchain, the datablock including the tracking metric and the geographic location information;
determining a shipment associated with the vehicle tracking device has reached a destination corresponding to the destination identifier by detecting, using the executable logic and the vehicle tracking update, that at of at least one of the following conditions are satisfied:
the vehicle tracking device has remained stationary for a predetermined amount of time included in the smart contract, or
the vehicle tracking device is positioned in a geographic area, the geographic area identified by the smart contract; and
synchronizing the blockchain with a plurality of blockchains stored in blockchain databases remote to the server node.

2. The method of aspect 1, further comprising:
generating, in response to determination that the shipment has reached the destination, a report comprising the tracking metric; and
sending, to a terminal device, a link configured to cause the terminal device to display an interface including the tracking metric.

3. The method of any of aspects 1 to 2, wherein the method comprises, responsive to the determined tracking metric, determining transportation costs associated with transportation of the shipment to the destination.

4. The method of any of aspects 1 to 3, further comprising:
receiving freight contract parameters, the freight contract parameters comprising the executable logic;
generate the smart contract in response to receipt of the freight contract parameters; and
store, on the blockchain, a genesis datablock, the genesis datablock comprising the smart contract.

5. The method of any of aspects 1 to 4, wherein appending a datablock further comprises:
identifying a tracking table in a previous datablock of the blockchain;
updating the tracking table with the tracking metric; and
including an updated tracking table in the datablock, the updated tracking table comprising the tracking metric.

6. The method of any of aspects 1 to 5, wherein identifying the smart contract further comprises:
identifying, in the blockchain, a contract datablock comprising the smart contract; and
extracting, from the contract datablock, the executable logic.

7. The method of any of aspects 1 to 6, wherein the blockchain comprises a first blockchain, the method further comprising:
determining, based on the executable logic and the vehicle tracking update, that a shipment associated with the vehicle tracking device has been transferred from a first carrier associated with the first block chain to a second carrier associated with a second blockchain;
receiving a plurality of additional vehicle tracking updates from the vehicle tracking device after determination that the shipment has been transferred to the second carrier; and
appending a plurality of datablocks to the second blockchain, the plurality of datablocks including tracking information corresponding to the additional vehicle tracking updates.

8. A system, comprising:
a processor, the processor configured to:
receive a tracking update created by a tracking device, the tracking update comprising geographic location information indicative of a geographic location of the tracking device;
determine, using executable logic of a smart contract stored in a blockchain, the tracking metric in response to receipt of the tracking update;
append a datablock to the blockchain, the datablock including the tracking metric; and
synchronize the blockchain with a plurality of blockchains stored in respective blockchain databases configured at respective server nodes.

9. The system of aspect 8, wherein the processor is further configured to:
identify a genesis datablock on the blockchain, the genesis datablock comprising the smart contract.

10. The system of any of aspects 8 to 9, wherein the processor is further configured to:
receive freight contract parameters, the freight contract parameters comprising the executable logic;
generate the smart contract in response to receipt of the freight contract parameters; and
store, on the blockchain, a contract datablock, the contract datablock comprising the smart contract.

11. The system of any of aspects 8 to 10, wherein the datablock is associated with a datablock type, wherein the processor is further configured to
communicate, to a terminal device, a first instruction to display a plurality of labels associated with respective data block types;
receive, from the terminal device, a selection input message, the selection input message indicative of a selection of the datablock type; and
communicate, to the terminal device in response to receipt of the selection input message, a second instruction to display information included in the datablock, the information including the tracking metric.

12. The system of any of aspects 8 to 11, wherein the blockchain comprises a first blockchain and the smart contract comprises a first smart contract, wherein the processor is further configured to:
identify a second blockchain comprising a second smart contract;
reprogram the tracking device with an identifier corresponding to the second smart contract;
receive an additional tracking update from the tracking device, the additional tracking update; and
store the additional tracking update in the second blockchain.

13. The system of any of aspects 8 to 12, wherein the processor is further configured to:
determine, based on the executable logic and the tracking update, that a shipment associated with the tracking device has reached a destination; and
cause the tracking device to stop sending tracking updates in response to determination that the shipment has reached the destination.

14. The system of any of aspects 8 to 13, wherein the smart contract includes a geographic area parameter corresponding to a geographical area, wherein the processor is further configured to:
determine, using the executable logic and the tracking update, that the tracking device is located within the geographic area; and
increase the tracking metric in response to determination that the tracking device is located within the geographic area, the tracking metric comprising a detention time metric.

15. A non-transitory computer readable storage medium comprising computer executable instructions, the computer executable instructions executable by a processor, the computer executable instructions comprising:
instructions executable to receive a tracking update created by a tracking device, the tracking update comprising geographic location information indicative of a geographic location of the tracking device;
instructions executable to determine, using a smart contract stored in a blockchain, the tracking metric in response to receipt of the tracking update;
instructions executable to append a datablock to the blockchain, the datablock including the tracking metric; and
instructions executable to synchronize the blockchain with a plurality of blockchains stored in blockchain databases.

16. The non-transitory computer readable storage medium of aspect 15, wherein the computer executable instructions further comprise:
instructions executable by the processor to identify a contract datablock on the blockchain, the contract datablock comprising the smart contract.

17. The non-transitory computer readable storage medium of any of aspects 15 to 16, wherein the computer executable instructions further comprise:
instructions executable by the processor to determine, based on the executable logic and tracking update, that a shipment has been transferred to a carrier; and
instructions executable by the processor to cause the tracking device to send tracking updates in response to determination that the shipment has been transferred to the carrier.

18. The non-transitory computer readable storage medium of any of aspects 15 to 17, wherein the computer executable instructions further comprise:
instructions executable by the processor to retrieve a tracking table in a previous datablock of the blockchain;
instructions executable by the processor to update the tracking table retrieved from the previous datablock with the tracking metric; and
instructions executable by the processor to include an updated tracking table in the datablock, the updated tracking table comprising the tracking metric.

19. The non-transitory computer readable storage medium of any of aspects 15 to 18, wherein the instructions executable by the processor to synchronize the blockchain further comprise:
instructions executable by the processor to communicate the datablock to a plurality of remote server nodes configured with a blockchain database, the blockchain database including a remote blockchain, the remote blockchain comprising the smart contract.

20. The non-transitory computer readable storage medium of any of aspects 15 to 19, wherein the smart contract includes a destination identifier, wherein the computer executable instructions further comprise:
instructions executable by the processor to determine, using the smart contract, a shipment associated with the tracking device has reached a destination corresponding to the destination identifier.
instructions executable by the processor to generate, in response to determination that the shipment has reached the destination, a report comprising the tracking metric; and
instructions executable by the processor to communicate, to a terminal device, a link configured to cause the terminal device to display an interface including the tracking metric.

What is claimed is:

1. A method, comprising:
receiving, by a server node in communication with a blockchain database, a vehicle tracking update created by a vehicle tracking device, the vehicle tracking device update comprising geographic location information indicative of a geographic location of the vehicle tracking device;
identifying, in a first blockchain stored in a database, a smart contract including destination identifier and executable logic configured to determine a tracking metric;
determining the tracking metric in response to receipt of the vehicle tracking update by calculating, using the executable logic, the tracking metric based on a comparison of the geographic location information of the vehicle tracking update and previous geographic location information included in a previous datablock of the first blockchain;

appending a datablock to the first blockchain, the datablock including the tracking metric and the geographic location information;

determining, based on the executable logic and the vehicle tracking update, that a shipment associated with the vehicle tracking device has been transferred from a first carrier associated with the first block chain to a second carrier associated with a second blockchain;

receiving a plurality of additional vehicle tracking updates from the vehicle tracking device after determination that the shipment has been transferred to the second carrier;

appending a plurality of datablocks to the second blockchain, the plurality of datablocks including tracking information corresponding to the additional vehicle tracking updates;

determining the shipment associated with the vehicle tracking device has reached a destination corresponding to the destination identifier by detecting, using the executable logic and the vehicle tracking update, that at least one of the following conditions are satisfied:

the vehicle tracking device has remained stationary for a predetermined amount of time included in the smart contract, or the vehicle tracking device is positioned in a geographic area, the geographic area identified by the smart contract; and synchronizing the second blockchain with a plurality of blockchains stored in blockchain databases remote to the server node.

2. The method of claim 1, further comprising:
generating, in response to determination that the shipment has reached the destination, a report comprising the tracking metric; and
sending, to a terminal device, a link configured to cause the terminal device to display an interface including the tracking metric.

3. The method of claim 2, wherein the method comprises, responsive to the determined tracking metric, determining transportation costs associated with transportation of the shipment to the destination.

4. The method of claim 1, further comprising:
receiving freight contract parameters, the freight contract parameters comprising the executable logic;
generate the smart contract in response to receipt of the freight contract parameters; and
store, on the first blockchain, a genesis datablock, the genesis datablock comprising the smart contract.

5. The method of claim 1, wherein appending the datablock to the first blockchain further comprises:
identifying a tracking table in a previous datablock of the first blockchain;
updating the tracking table with the tracking metric; and
including an updated tracking table in the datablock, the updated tracking table comprising the tracking metric.

6. The method of claim 1, wherein identifying the smart contract further comprises:
identifying, in the first blockchain, a contract datablock comprising the smart contract; and
extracting, from the contract datablock, the executable logic.

7. A system, comprising:
a tracking device positioned with a shipment and in wireless communication with a network;
a processor in communication with a server node comprising a blockchain database, the processor configured to—:
receive, over the network, a tracking update created by the tracking device, the tracking update comprising geographic location information indicative of a geographic location of the tracking device;
calculate, using executable logic of a first smart contract stored in a first blockchain in the blockchain database, a tracking metric using the geographic location information, the tracking metric calculated in response to receipt of the tracking update;
append a datablock to the first blockchain, the datablock including the tracking metric;
synchronize the first blockchain with a plurality of blockchains stored in respective blockchain databases configured at respective server nodes;
identify a second blockchain comprising a second smart contract;
reprogram the tracking device with an identifier corresponding to the second smart contract; receive an additional tracking update from the tracking device; and
store the additional tracking update in the second blockchain.

8. The system of claim 7, wherein the processor is further configured to:
identify a genesis datablock on the first blockchain, the genesis datablock comprising the first smart contract.

9. The system of claim 7, wherein the processor is further configured to:
receive freight contract parameters, the freight contract parameters comprising the executable logic;
generate the first smart contract in response to receipt of the freight contract parameters; and
store, on the first blockchain, a contract datablock, the contract datablock comprising the first smart contract.

10. The system of claim 7, wherein the datablock is associated with a datablock type, wherein the processor is further configured to
communicate, to a terminal device, a first instruction to display a plurality of labels associated with respective data block types;
receive, from the terminal device, a selection input message, the selection input message indicative of a selection of the datablock type; and
communicate, to the terminal device in response to receipt of the selection input message, a second instruction to display information included in the datablock, the information including the tracking metric.

11. The system of claim 7, wherein the processor is further configured to:
determine, based on the executable logic and a third tracking update, that the shipment associated with the tracking device has reached a destination; and
cause the tracking device to stop sending tracking updates in response to determination that the shipment has reached the destination.

12. The system of claim 7, wherein the first smart contract includes a geographic area parameter corresponding to a geographical area, wherein the processor is further configured to:
determine, using the executable logic and the tracking update, that the tracking device is located within the geographic area; and increase the tracking metric in response to determination that the tracking device is located within the geographic area, the tracking metric comprising a detention time metric.

13. A non-transitory computer readable storage medium comprising computer executable instructions, the computer executable instructions executable by a processor, the computer executable instructions comprising:
    instructions executable to receive, over a communication network, a tracking update created by a tracking device positioned with a shipment, the tracking update comprising geographic location information indicative of a geographic location of the tracking device;
    instructions executable to calculate, using a smart contract stored in a blockchain and the geographic location information, a tracking metric in response to receipt of the tracking update;
    instructions executable to append a datablock to the blockchain, the datablock including the tracking metric;
    instructions executable to synchronize the blockchain with a plurality of blockchains stored in blockchain databases;
    instructions executable to retrieve the smart contract from the block chain;
    instructions executable to execute logic of the smart contract to determine occurrence of an event defined in the smart contract and related to the shipment and the tracking metric; and
    instructions executable to re-program the tracking device, responsive to the event, by communication of a registration message over the communication network to the tracking device, the registration message comprising authentication information associated with the blockchain for use by the tracking device to communicate another tracking update.

14. The non-transitory computer readable storage medium of claim 13, wherein the computer executable instructions further comprise:
    instructions executable by the processor to identify a contract datablock on the blockchain, the contract datablock comprising the smart contract.

15. The non-transitory computer readable storage medium of claim 13, wherein the computer executable instructions further comprise:
    instructions executable by the processor to determine, based on the logic of the smart contract and the tracking update, that the shipment has been transferred to a carrier; and
    instructions executable by the processor to cause the tracking device to send tracking updates in response to determination that the shipment has been transferred to the carrier.

16. The non-transitory computer readable storage medium of claim 13, wherein the computer executable instructions further comprise:
    instructions executable by the processor to retrieve a tracking table in a previous datablock of the blockchain;
    instructions executable by the processor to update the tracking table retrieved from the previous datablock with the tracking metric; and
    instructions executable by the processor to include an updated tracking table in the datablock, the updated tracking table comprising the tracking metric.

17. The non-transitory computer readable storage medium of claim 13, wherein the instructions executable by the processor to synchronize the blockchain further comprise:
    instructions executable by the processor to communicate the datablock to a plurality of remote server nodes configured with a blockchain database, the blockchain database including a remote blockchain, the remote blockchain comprising the smart contract.

18. The non-transitory computer readable storage medium of claim 13, wherein the smart contract includes a destination identifier, wherein the computer executable instructions further comprise:
    instructions executable by the processor to determine, using the smart contract, the shipment associated with the tracking device has reached a destination corresponding to the destination identifier;
    instructions executable by the processor to generate, in response to determination that the shipment has reached the destination, a report comprising the tracking metric; and
    instructions executable by the processor to communicate, to a terminal device, a link configured to cause the terminal device to display an interface including the tracking metric.

19. The non-transitory computer readable storage medium of claim 13, wherein the computer executable instructions further comprise:
    instructions executable by the processor to generate and communicate a control message to the tracking device, the control message executable by the tracking device.

20. The non-transitory computer readable storage medium of claim 19, wherein the computer executable instructions further comprise:
    instructions executable by the processor to append, to the blockchain, another datablock comprising tracking device information, the tracking device information comprising the registration message, the control message, a configuration of the tracking device, or a combination thereof.

* * * * *